US011623691B2

United States Patent
Okamoto et al.

(10) Patent No.: US 11,623,691 B2
(45) Date of Patent: Apr. 11, 2023

(54) VEHICLE FRONT STRUCTURE

(71) Applicant: MAZDA MOTOR CORPORATION, Hiroshima (JP)

(72) Inventors: Hiroyuki Okamoto, Aki-gun (JP); Fumihiro Kurohara, Aki-gun (JP); Ippei Kuroda, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 513 days.

(21) Appl. No.: 16/927,790

(22) Filed: Jul. 13, 2020

(65) Prior Publication Data

US 2021/0024134 A1  Jan. 28, 2021

(30) Foreign Application Priority Data

Jul. 24, 2019  (JP) .............................. JP2019-135935

(51) Int. Cl.
  *B62D 21/11*  (2006.01)
  *B60R 17/00*  (2006.01)
  *B62D 5/04*  (2006.01)
  *B62D 21/15*  (2006.01)

(52) U.S. Cl.
  CPC .............. *B62D 21/11* (2013.01); *B60R 17/00* (2013.01); *B62D 5/0424* (2013.01); *B62D 21/15* (2013.01)

(58) Field of Classification Search
  CPC ...... B62D 21/11; B62D 5/0424; B62D 21/15; B62D 21/155; B62D 25/08; B62D 25/082; B62D 5/0403; B60R 17/00
  See application file for complete search history.

(56) References Cited

U.S. PATENT DOCUMENTS

| 7,988,164 | B2 * | 8/2011 | Schmidt | B62D 5/0424 |
| | | | | 180/443 |
| 9,676,417 | B2 * | 6/2017 | Yamada | B62D 21/152 |
| 10,625,785 | B2 * | 4/2020 | Komiya | B62D 21/11 |
| 11,279,409 | B2 * | 3/2022 | Shimizu | B62D 21/152 |
| 2015/0367797 | A1 * | 12/2015 | Kurokawa | B62D 25/08 |
| | | | | 293/133 |

FOREIGN PATENT DOCUMENTS

| JP | 2016150685 A | * | 8/2016 | ............. B60R 19/34 |
| JP | 2017-213982 A | | 12/2017 | |

* cited by examiner

*Primary Examiner* — James A Shriver, II
*Assistant Examiner* — Michael T. Walsh
(74) *Attorney, Agent, or Firm* — Studebaker & Brackett PC

(57) ABSTRACT

To restrain a retracting stabilizer from interfering with an assist motor located rearward thereof and ensure energy absorption by a subframe, a vehicle front structure includes an engine; a steering rack disposed frontward of the engine; an assist motor for power steering disposed frontward of the steering rack; a suspension stabilizer disposed frontward of the assist motor; and a subframe mounted with the stabilizer. The stabilizer frontward of the assist motor is disposed offset from the assist motor in an up-down direction so as not to overlap the assist motor in vehicle front view.

10 Claims, 12 Drawing Sheets

VEHICLE FRONT STRUCTURE

BACKGROUND

Technical Field

This disclosure relates to a vehicle front structure including a vehicle driving apparatus, a steering rack disposed frontward of the vehicle driving apparatus, an assist motor for power steering disposed frontward of the steering rack, a suspension stabilizer disposed frontward of the assist motor, and a subframe supporting the stabilizer.

Background Art

There is known a vehicle front structure that includes a vehicle driving apparatus such as an engine, a pair of left and right front side frames extending in a vehicle front-rear direction at respective sides of the vehicle driving apparatus, and a subframe supported by the front side frames.

The pair of left and right front side frames extend more frontward than the vehicle driving apparatus from a dash panel installed at a front side of a vehicle interior. The front side frames are provided at their respective front ends with main crash cans, and a bumper beam is provided at front ends of these left and right main crash cans so as to extend in a vehicle width direction.

The subframe structure is provided at its left and right front ends with sub crash cans, and a sub bumper beam is provided at front ends of these left and right sub crash cans so as to extend in a vehicle width direction.

In the event of a collision at a front side of the vehicle (hereinafter abbreviated as a "front-end collision"), shock absorbing members such as main crash cans and sub crash cans are sequentially crushed rearward in the vehicle, whereby collision energy is absorbed.

When the collision energy cannot be fully absorbed by these shock absorbing members, residual collision energy is expected to be absorbed by breakage or axial compression of front side frames on the vehicle body side.

However, portions of the front side frames that are rearward of a front side of a robust vehicle driving apparatus such as an engine do not crush, and thus energy absorption by these rear portions cannot be expected.

Further, when, for example, the vehicle driving apparatus is a longitudinal engine, its front side is positioned farther frontward than that of a transverse engine, and thus it is important to increase energy absorption at the frontward side as much as possible.

Thus, the present inventors have looked at making the subframe itself absorb energy by actively retracting a front portion of the subframe located frontward of the front side of the vehicle driving apparatus in particular.

Japanese Patent Laid-Open No. 2017-213982 discloses a suspension member structure (corresponding to the subframe of the present disclosure) including a pair of left and right side rails extending in the vehicle front-rear direction, and a first cross member and a second cross member each connecting the pair of left and right side rails in the vehicle width direction.

In the suspension member structure of Japanese Patent Laid-Open No. 2017-213982, a power steering gear box including a power steering motor is supported by the second cross member (see paragraph [0014] of Japanese Patent Laid-Open No. 2017-213982) and a stabilizer is supported by the first cross member located frontward of the second cross member in the vehicle (see paragraph [0017] of Japanese Patent Laid-Open No. 2017-213982).

However, if the retracting stabilizer interferes with an assist motor located rearward thereof at the front of the vehicle driving apparatus in the event of a front-end collision, there is fear that the subframe on which the stabilizer is mounted cannot retract further rearward, which may consequently inhibit the subframe from absorbing the collision energy.

Japanese Patent Laid-Open No. 2017-213982 does not disclose positional relationship between the stabilizer and the power steering motor in an up-down direction nor behavior of the subframe in the event of a front-end collision, leaving it necessary to address the above fear.

SUMMARY

The present disclosure thus provides a vehicle front structure that allows to restrain the retracting stabilizer from interfering with the assist motor located rearward thereof and thus to ensure energy absorption by the subframe.

A vehicle front structure of this disclosure includes: a vehicle driving apparatus; a steering rack disposed frontward of the vehicle driving apparatus; an assist motor for power steering disposed frontward of the steering rack; a bar-shaped vehicle component disposed frontward of the assist motor so as to extend in a vehicle width direction; and a subframe mounted with the vehicle component. The vehicle component frontward of the assist motor is disposed offset from the assist motor in an up-down direction so as not to overlap the assist motor in vehicle front view.

The above configuration allows to restrain the retracting vehicle component from interfering with the assist motor located rearward thereof in the event of a front-end collision, and thus allows the subframe to retract in a space frontward of the vehicle driving apparatus. This allows to ensure energy absorption by the subframe in the event of a front-end collision.

In one aspect of this disclosure, the vehicle component is a stabilizer.

The stabilizer is a bar-shaped vehicle component mounted of the subframe so as to connect between left and right front-rear frames (described later) of the subframe at the front of the assist motor, and accordingly the use of the above configuration allows to restrain the retracting stabilizer from interfering with the assist motor located rearward thereof in the event of a front-end collision and consequently ensure energy absorption by the subframe in the event of a front-end collision.

In one aspect of this disclosure, the subframe includes a pair of left and right front-rear frames each mounted with a suspension arm, the vehicle component is disposed at a position offset downward from the assist motor, a reducer for the assist motor is disposed between the assist motor and one of the front-rear frames, and the vehicle component is mounted on upper walls of the respective front-rear frames, and the vehicle component is extended below and on a vehicle-width-direction outer side of the reducer and the assist motor so as to bypass the reducer and the assist motor so that a portion of the vehicle component located on a vehicle-width-direction inner side of portions thereof mounted on the respective upper walls does not overlap the reducer in front view.

The above configuration allows to restrain the retracting vehicle component not only from interfering with the assist motor as described above but also from interfering with the reducer in the event of a front-end collision.

In one aspect of this disclosure, the vehicle driving apparatus includes a vehicle driving apparatus body and an accessory projecting frontward from a front side of the vehicle driving apparatus body, and the accessory is disposed above the assist motor.

In the above configuration, the vehicle component is disposed offset downward from the assist motor, which allows to avoid interference not only with the assist motor but also with the accessory provided to the engine in the event of a front-end collision.

In one aspect of this disclosure, the assist motor is disposed transversely such that an axis of a cylindrical case extends along the vehicle width direction.

The above configuration allows to restrain the retracting vehicle component from being caught by the assist motor in the event of a front-end collision even if the vehicle component contacts the assist motor.

In one aspect of this disclosure, the vehicle driving apparatus includes a vehicle driving apparatus body and an oil pan disposed below the vehicle driving apparatus body, and the vehicle driving apparatus includes a retracted portion below a front side of the vehicle driving apparatus, the retracted portion being formed by retracting a front side of the oil pan rearward relative to a front side of the vehicle driving apparatus body, and the assist motor is disposed in the retracted portion.

The above configuration allows to ensure distance in the front-rear direction between the vehicle component and the assist motor.

This facilitates bending deformation of the front-rear frame into a Z shape in vehicle side view in the event of a front-end collision.

In one aspect of this disclosure, the subframe includes a transverse member extending in the vehicle width direction, the transverse member and the vehicle component are disposed adjacent to each other in a vehicle front-rear direction, and a cross-sectional height of a portion of the transverse member located immediately frontward of the assist motor is set such that a top side of the portion is positioned lower than a lower end of the assist motor lower without a bottom side of the portion being lowered in position.

The above configuration allows to restrain the retracting transverse member from interfering with the assist motor in the event of a front-end collision and consequently facilitates bending deformation of the front-rear frame into a Z shape in vehicle side view, and also ensures a minimum ground clearance of the transverse member.

Here, setting the cross-sectional height of the portion of the transverse member located immediately frontward of the assist motor to be lower than the lower end of the assist motor refers to reducing the thickness in the up-down direction of the portion immediately frontward of the assist motor so as to make a top side of the portion lower than the lower end of the assist motor while maintaining the height of a bottom side of the portion.

The present disclosure allows to restrain the retracting vehicle component from interfering with the assist motor located rearward thereof and thus to ensure energy absorption by the subframe.

DETAILED DESCRIPTION

Referring to FIGS. 1 to 10, a description will be given of a front vehicle body structure having a suspension subframe structure of the present embodiment.

In the figures, an arrow F represents a vehicle frontward direction, an arrow U represents a vehicle upward direction, an arrow R represents a vehicle rightward direction, and an arrow L represents a vehicle leftward direction.

Figure 1:
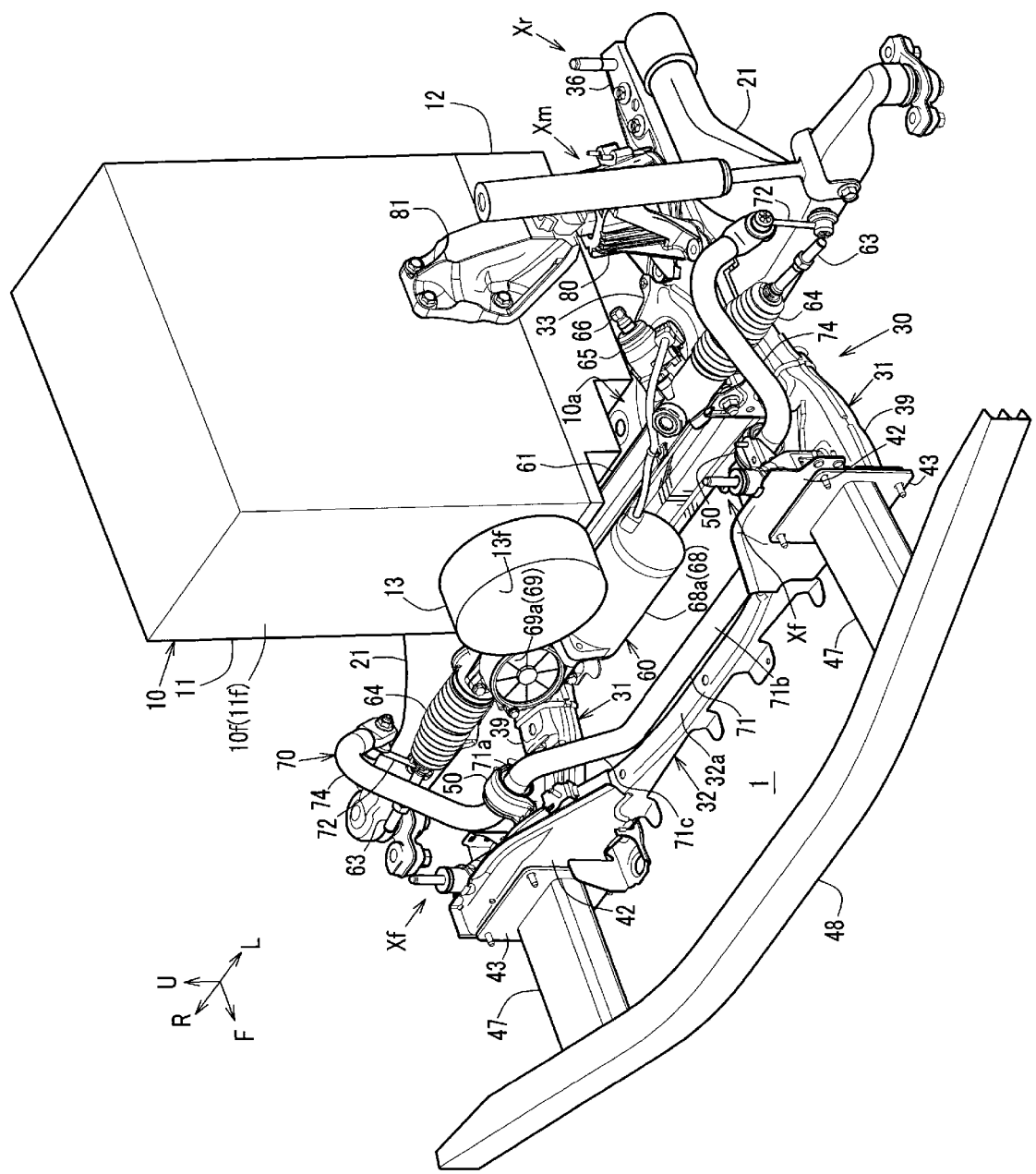
FIG. 1 is an external view of a front vehicle body structure having a front suspension subframe structure of the present embodiment, as viewed from the front.
Figure 3:
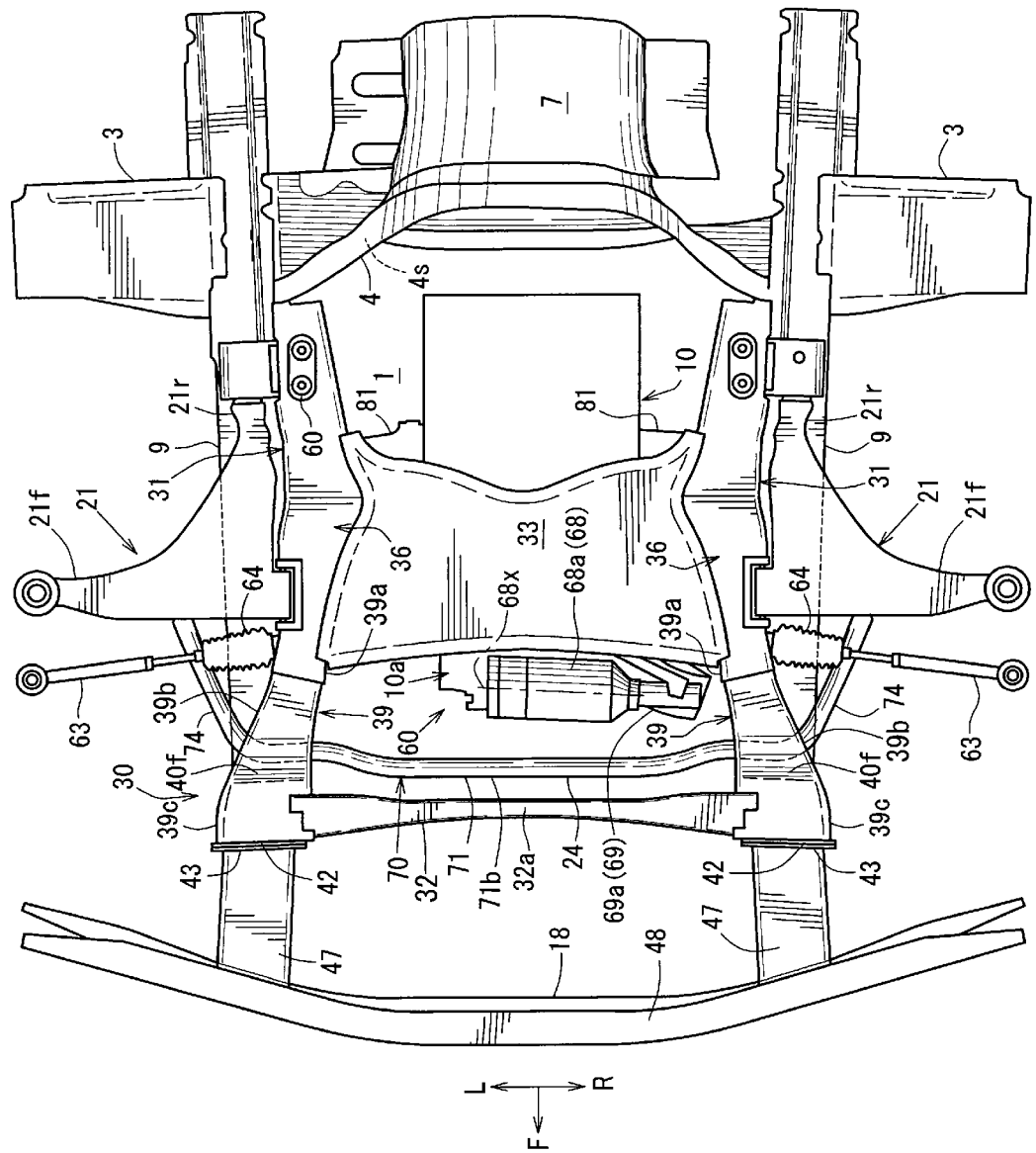
FIG. 3 is a bottom view of the front vehicle body structure having the subframe structure of the present embodiment.
Figure 4:
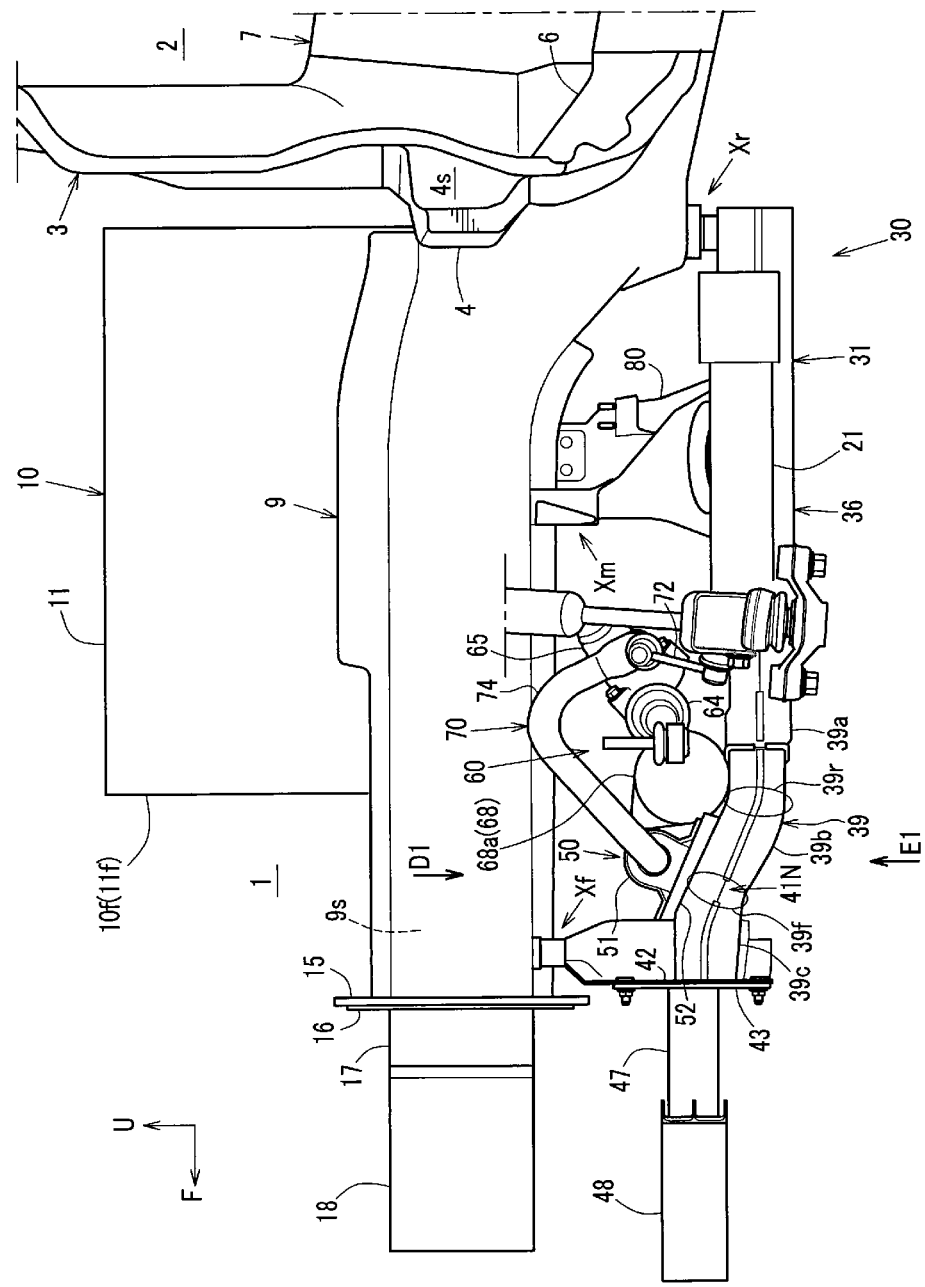
FIG. 4 is a left side view of the front vehicle body structure having the subframe structure of the present embodiment.

As shown in FIGS. 1 and 4, the front vehicle body structure includes: an engine 10 disposed in an engine compartment 1 partitioned from a vehicle interior 2 by a dash panel 3 (dash lower panel) (see FIGS. 1 to 3); front side frames 9 (see the same figures) extending in a vehicle front-rear direction at respective sides of the engine compartment 1; a suspension subframe structure 30 (hereinafter referred to as a "subframe 30") supported by the front side frames 9.

Figure 2:
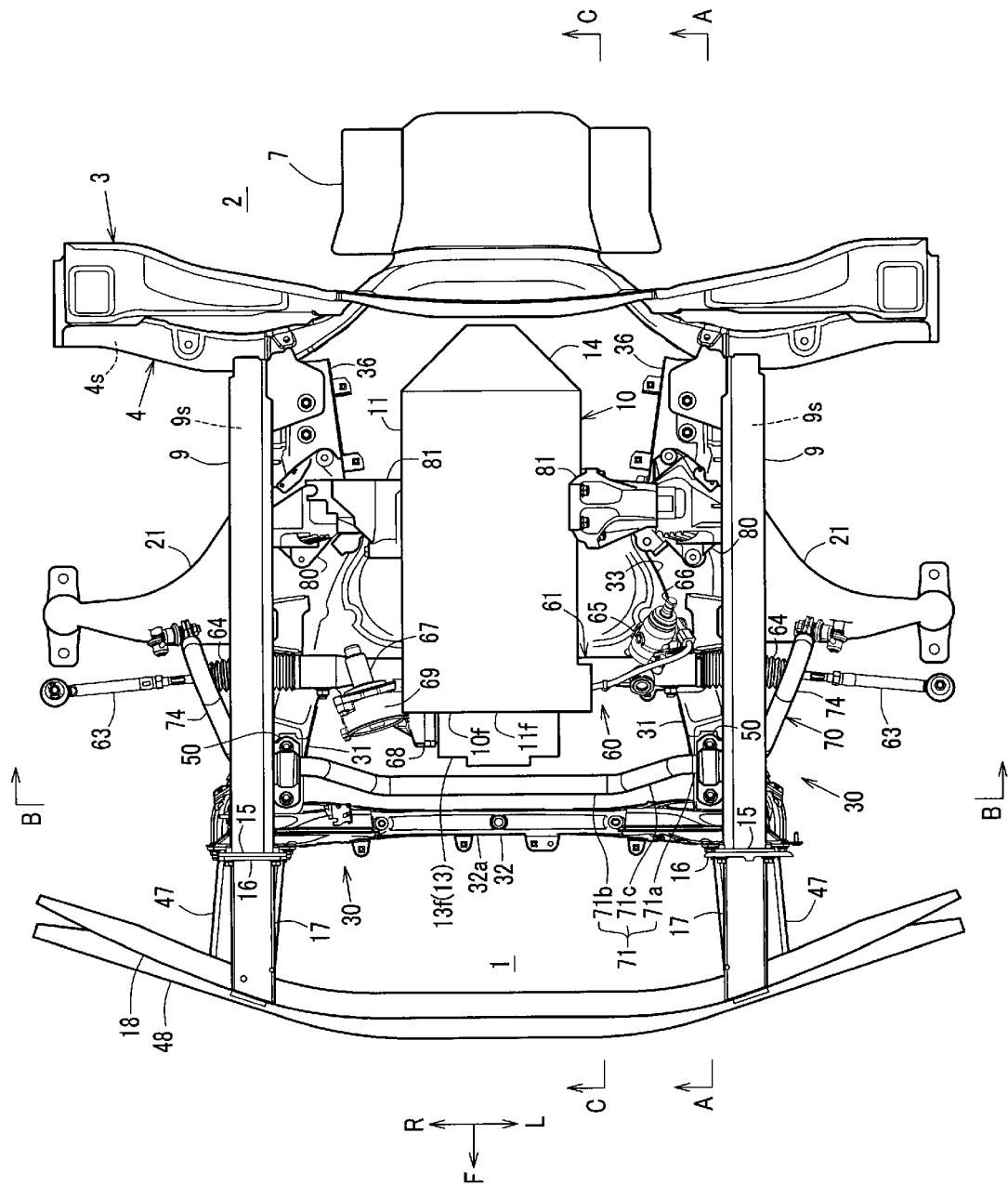
FIG. 2 is a plan view of the front vehicle body structure having the subframe structure of the present embodiment.

In this embodiment, the drive system of the vehicle is a front engine rear drive (FR) system. As shown in FIG. 1, the engine 10 includes: a cylinder block 11 as an engine body; an oil pan 12 located below the cylinder block 11; and a pulley 13 as an accessory protruding frontward from a lower portion of a front side (11*f*) of the cylinder block 11, and the engine 10 is longitudinally installed such that a cylinder array is oriented along the vehicle front-rear direction. As shown in FIG. 2, a power train including a transmission 14 connected to the engine 10 is installed rearward of the engine 10 in the engine compartment 1.

Reference numeral 4 in FIGS. 2 to 4 denotes a dash cross member and, as shown in FIG. 4, the dash cross member 4 is joined to a front face of the dash panel 3 such that a closed cross-section 4*s* extending in a vehicle width direction is formed between the dash cross member 4 and the front face of the dash panel 3. Reference numeral 6 in FIG. 4 denotes a floor panel defining a floor of the vehicle interior 2, and the floor panel 6 is disposed continuously from a lower portion of the dash panel 3. Reference numeral 7 in FIGS. 2 to 4 denotes a tunnel portion, and the tunnel portion 7 is provided at the center in the vehicle width direction of the dash panel 3 and the floor panel 6 so as to protrude into the vehicle interior 2.

A belt for transmitting rotation of the engine 10 to an alternator (power generator) to thereby drive the alternator is stretched around the pulley 13, though not shown in the figures.

As shown in FIGS. 2 and 4, the pair of left and right front side frames 9 extend from the dash panel 3 and the dash cross member 4 frontward farther than the front side (10*f*) of the engine 10. Each of the front side frames 9 is a vehicle body strengthening member having a closed cross-section 9*s* extending in the vehicle front-rear direction.

As shown in FIGS. 2 and 4, a main crash can 17 composed of a cylindrical body and the like for absorbing an impact load from the front of the vehicle is connected to a front end of each of the left and right front side frames 9 via a set plate 15 and a mounting plate 16. A main bumper beam 18 extending in the vehicle width direction is mounted on front end faces of the pair of left and right main crash cans 17.

Now a description will be given of the aforementioned subframe 30. The subframe 30 includes a pair of left and right front-rear frames 31 disposed below the front side frames 9 and supporting respective lower arms 21 as suspension members for front wheels, and a front cross member 32 and a center cross member 33 each connecting the left and right front-rear frames 31.

As shown in FIG. 3, each lower arm 21 supported by the suspension subframe structure 30 includes a front arm portion 21*f* extending substantially parallel to the vehicle width direction, and a rear arm portion 21*r* extending substantially horizontally from an intermediate portion in the vehicle width direction of the front arm portion 21*f* inwardly in the vehicle width direction and rearwardly. The lower arm 21 as a whole has a substantially L shape in plan view.

As shown in FIGS. 1, 3, and 4, at the front of the subframe 30, there are provided a pair of left and right sub crash cans 47 that extend from respective front ends of the left and right front-rear frames 31 each via a set plate 42 and a mounting plate 43. A sub bumper beam 48 extending in the vehicle width direction is provided at the front of the sub crash cans 47. The left and right sub crash cans 47 are connected to each other via the sub bumper beam 48.

As shown in FIGS. 4, 5, and 7 to 10, each front-rear frame 31 includes a rear horizontal portion 39*a* extending substantially horizontally in the vehicle front-rear direction, an inclined portion 39*b* extending from a front end of the rear horizontal portion 39*a* inclinedly frontward and upward, and a front horizontal portion 39*c* extending from a front end of the inclined portion 39*b* substantially horizontally frontward in the vehicle.

Figure 5:
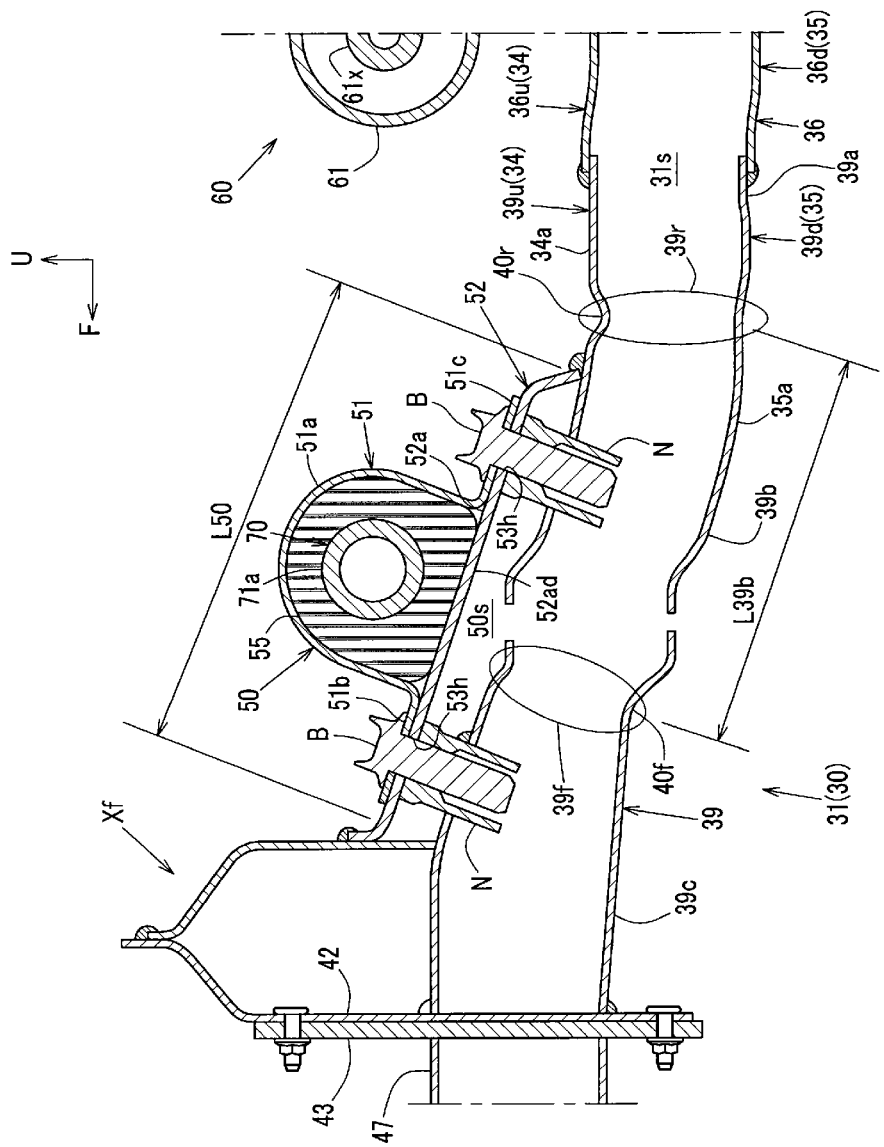
FIG. 5 is a sectional view of major parts taken along the line A-A in FIG. 2.
Figure 7:
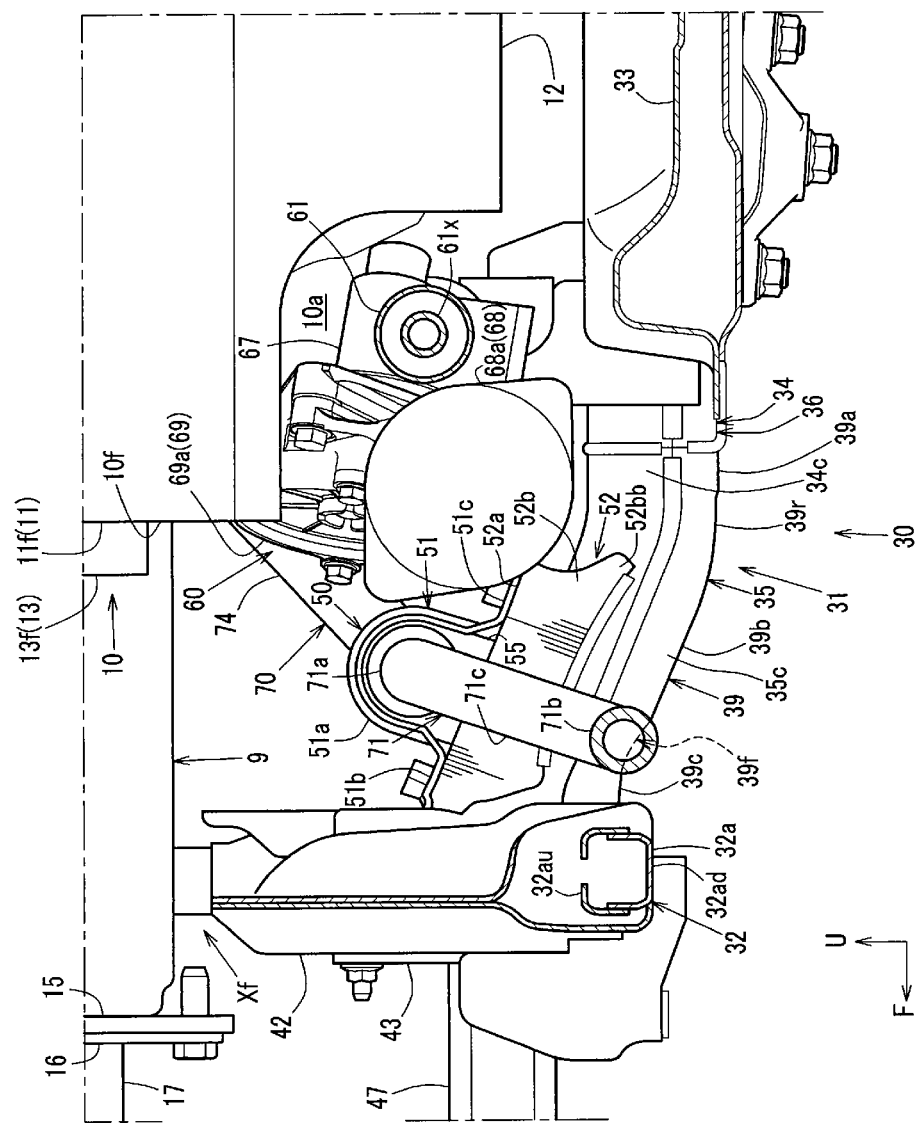
FIG. 7 is a sectional view of major parts taken along the line C-C in FIG. 2.

In the front-rear frame 31, both of a boundary portion 39*r* between the rear horizontal portion 39*a* and the inclined portion 39*b* and a boundary portion 39*f* between the inclined portion 39*b* and the front horizontal portion 39*c* are bent-formed. Here, the boundary portion 39*r* between the rear horizontal portion 39*a* and the inclined portion 39*b* is defined as a rear boundary portion 39*r* (also referred to as a rear bent portion 39*r*), and the boundary portion 39*f* between the inclined portion 39*b* and the front horizontal portion 39*c* is defined as a front boundary portion 39*f* (also referred to as a front bent portion 39*f*). As shown in FIGS. 4, 5, and 7, the rear boundary portion 39*r* is formed to protrude in a front downward direction in vehicle side view, and the front boundary portion 39*f* is formed to protrude in a rear upward direction in vehicle side view.

As shown in FIGS. 4 and 7, each front-rear frame 31 is disposed such that a rear end of the inclined portion 39*b*, namely the rear boundary portion 39*r* is at substantially the same position as the front end 10*f* of the longitudinally installed engine 10 in the vehicle front-rear direction or is positioned frontward of the front end 10*f* of the engine 10 in the vehicle.

In the present embodiment, the rear boundary portion 39*r* is disposed at substantially the same position as the front end 10*f* of the engine 10 in the vehicle front-rear direction, and at least the front boundary portion 39*f* is positioned frontward of the front end 10*f* of the engine 10 in the vehicle. It should be noted that the front end 10*f* of the engine 10 in the present embodiment refers to a front side of the engine body portion, namely the front side 11*f* of the cylinder block 11.

Disposing the front boundary portion 39*f* frontward of the front end 10*f* of the engine 10 and forming the front horizontal portion 39*c* and the rear horizontal portion 39*a* such that they are offset (shifted) from each other in the up-down direction and the front-rear direction in this manner allows the front-rear frame 31 to be bent and deformed into a Z shape in vehicle side view in the event of a front-end collision, which in turn allows for increased energy absorption by the subframe 30.

As shown in FIGS. 5 and 8 to 10, the rear boundary portion 39*r* of each front-rear frame 31 is formed with a recess 40*r* extending in the vehicle width direction, and the front boundary portion 39*f* of each front-rear frame 31 is formed with a recess 40*f* extending in the vehicle width direction.

Figure 8:
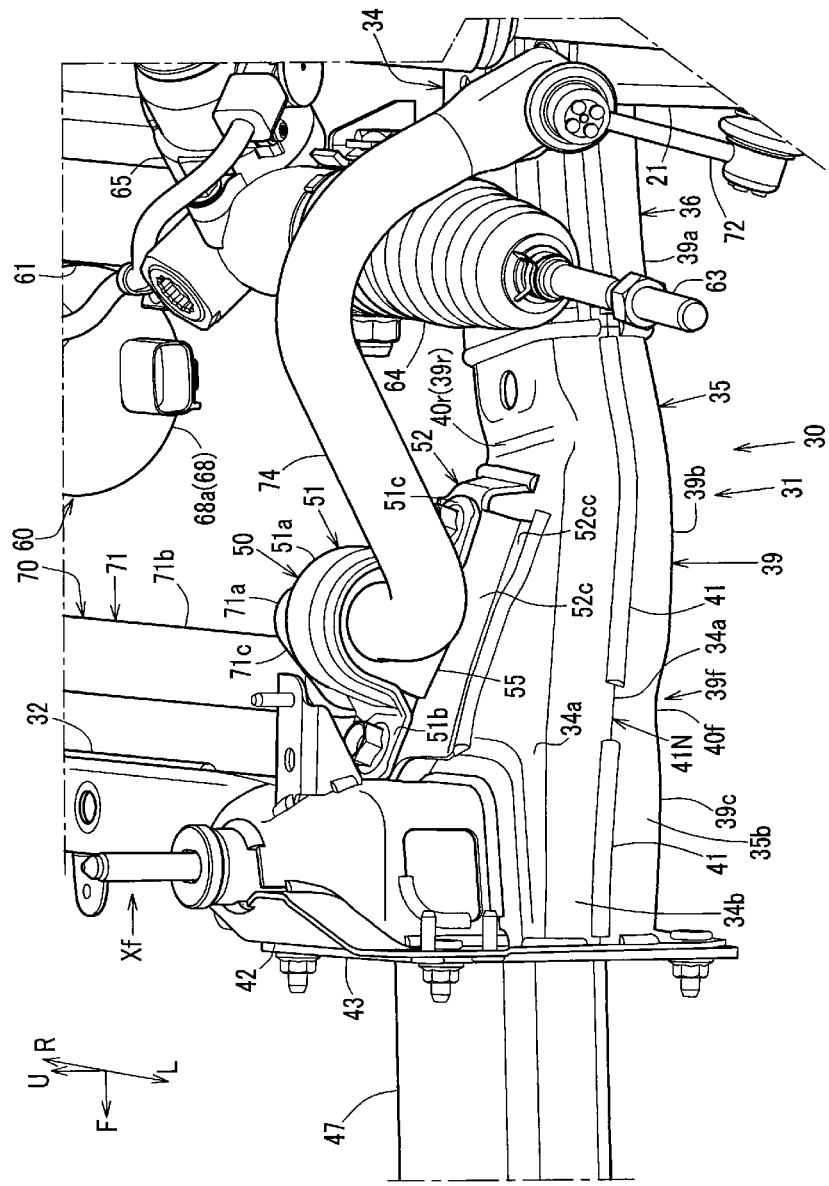
FIG. 8 is an enlarged view of major parts as viewed in the direction of an arrow D1 in FIG. 4 and in the direction of an arrow D2 in FIG. 6.
Figure 9:
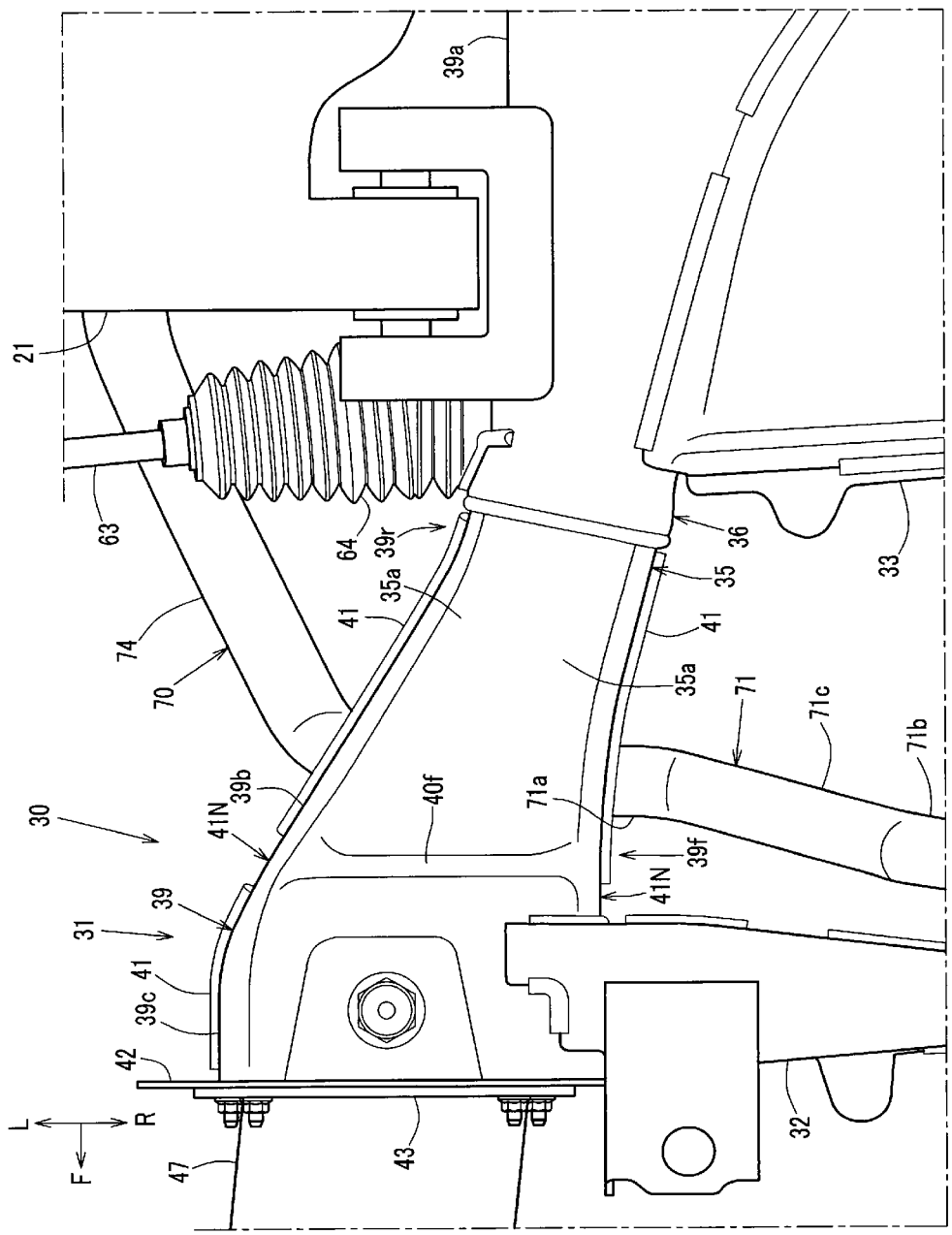
FIG. 9 is a bottom view of major parts as viewed in the direction of an arrow E1 in FIG. 4 and in the direction of an arrow E2 in FIG. 6.
Figure 10:
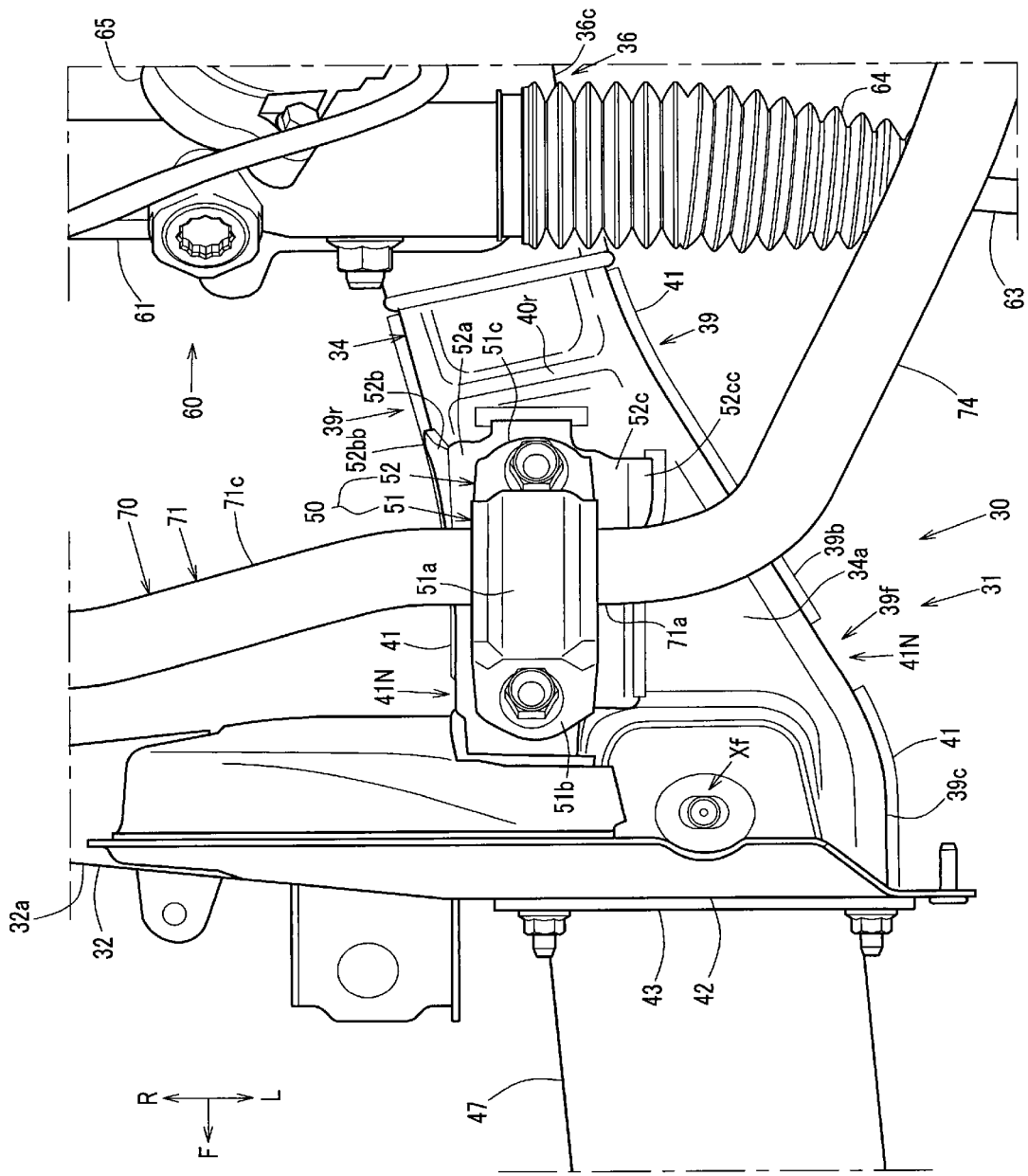
FIG. 10 is a plan view of major parts as viewed in the direction of the arrow D1 in FIG. 4 and in the direction of an arrow F1 in FIG. 6.

Of these recesses 40*f*, 40*r*, the recess 40*r* on the rear side formed in the rear boundary portion 39*r* (hereinafter also referred to as the "rear recess 40*r*") is formed on a lower wall 35*a* of the front-rear frame 31 so as to face upward as shown in FIGS. 5, 8, and 10, and of these recesses 40*f*, 40*r*, the recess 40*f* on the front side formed in the front boundary portion 39*f* (hereinafter also referred to as the "front recess 40*f*") is formed on an upper wall 34*a* of the front-rear frame 31 so as to face downward as shown in FIGS. 5 and 9.

While it is preferable that both of the recesses 40*f*, 40*r* be provided respectively in the rear boundary portion 39*r* and the front boundary portion 39*f* as in the present embodiment, a configuration is also possible in which the recess is provided in at least one of the rear boundary portion 39*r* and the front boundary portion 39*f*.

As shown in FIGS. 3 and 9, each front-rear frame 31 is structured such that the rear horizontal portion 39*a* is positioned on a vehicle-width-direction inner side relative to the front end of the front horizontal portion 39*c* and the front-rear frame 31 is gradually positioned toward a vehicle-width-direction outer side from the front end of the rear horizontal portion 39*a* to the front end of the front horizontal portion 39*c*.

In the present embodiment, the left and right inclined portions 39*b* extend inclinedly in the up-down direction such that they are located upward as they go frontward as described above (see FIG. 7), and additionally, they extend inclinedly in the vehicle width direction too such that a distance between them in the vehicle width direction gradually widens as they go frontward, as shown in FIG. 3.

As shown in FIGS. 5, 7, and 8, each front-rear frame 31 has an upper and lower divided structure that is composed of an upper member 34 having a substantially U-shaped cross section opening downward and a lower member 35 having a substantially U-shaped cross section opening upward.

The upper member 34 includes the upper wall 34*a* (see FIGS. 8 and 10) and an outer wall 34*b* (see FIG. 8) and an inner wall 34c (see FIG. 7) in the vehicle width direction, and the lower member 35 includes the lower wall 35a (see FIG. 9) and an outer wall 35b (see FIG. 8) and an inner wall 35c (see FIG. 7) in the vehicle width direction.

As shown in FIGS. 8 to 10, the outer wall 34b of the upper member 34 and the outer wall 35b of the lower member 35 of the front-rear frame 31, and the inner wall 34c of the upper member 34 and the inner wall 35c of the lower member 35 of the front-rear frame 31 are joined by arc welding and the like each along the vehicle front-rear direction.

As a result of this formation of joined portions 41, which respectively join inner wall portions and outer wall portions in the vehicle width direction of the upper member 34 and the lower member 35 (see FIGS. 9 and 10), the front-rear frame 31 is formed therein a closed cross-section 31s that is continuous in the vehicle front-rear direction (see FIG. 5).

However, as shown in FIGS. 8 to 10, at a portion in the vehicle front-rear direction of the front-rear frame 31 overlapping (lapping) a stabilizer mounting bracket 50 (described later), the front-rear frame 31 is provided with an unjoined area 41N on both inner and outer sides thereof in the vehicle width direction, where the joined portion 41 is partially absent.

In other words, the aforementioned front-rear frame 31 includes a body member 36 extending in the vehicle front-rear direction and an extended member 39 extending frontward in the vehicle from a front end of the body, as shown in FIGS. 3 to 5 and 7 to 10.

The rear horizontal portion 39a corresponds to a rear portion of the extended member 39 and the body member 36 and is formed substantially horizontally in the vehicle front-rear direction over the rear portion of the extended member 39 and the body member 36. The inclined portion 39b corresponds to an intermediate portion in the vehicle front-rear direction of the extended member 39 and its nearby areas around the intermediate portion, and the front horizontal portion 39c corresponds to a front portion of the extended member 39.

A more detailed description will be given of the upper and lower divided structure of the front-rear frame 31. As shown in FIG. 5, the body member 36 has an upper and lower divided structure that is composed of an upper member 36u having a substantially U-shaped cross section opening downward and a lower member 36d having a substantially U-shaped cross section opening upward. The extended member 39 has an upper and lower divided structure that is composed of an upper member 39u having a substantially U-shaped cross section opening downward and a lower member 39d having a substantially U-shaped cross section opening upward.

In the front-rear frame 31, at a front portion of the rear horizontal portion 39a in the vehicle front-rear direction, where the boundary portion between the body member 36 and the extended member 39 is located, a front end of the body member 36 and a rear end of the extended member 39 are joined together by welding and the like along their circumferential direction (see FIGS. 7 to 10). That is, as shown in FIG. 5, the upper member 36u of the body member 36 and the upper member 39u of the extended member 39 constitute the upper member 34 of the front-rear frame 31, and the lower member 35d of the body member 36 and the lower member 39d of the extended member 39 constitute the lower member 35 of the front-rear frame 31.

The above upper members 36u, 39u and lower members 36d, 39d provided respectively to the body member 36 and the extended member 39 have a relation in strength between them. The relationship is set as follows.

That is, the strength of the lower member 39d of the extended member 39 is relatively smallest, and the strength of the upper member 39u of the extended member 39 is set larger than the strength of the lower member 39d. The strength of the upper member 36u and the lower member 36d of the body member 36 is set larger than the strength of the upper member 39u.

The strength of the upper member 36u and the lower member 36d of the body member 36 is set almost equal to each other. As such, constituents of the front-rear frames 31 have the relationship in strength between them, which is given by, for example, varying materials or plate thickness or applying heat treatment.

As described above, the front-rear frame 31 is provided with the unjoined area 41N at its portion in the vehicle front-rear direction overlapping the stabilizer mounting bracket 50 (described later), and is given a relatively lower strength at its front lower portion (the lower member 39d) in particular. Additionally, as described above, the front-rear frame 31 is formed with the front recess 40f on the lower wall 35a in the front boundary portion 39f and formed with the rear recess 40r on the upper wall 34a in the rear boundary portion 39r; the front recess 40f and the rear recess 40r serve as a breakage starter for inward bending deformation of the lower wall 35a and the upper wall 34a, respectively, when the front-rear frame 31 is bent and deformed into a Z shape in vehicle side view in the event of a front-end collision. This configuration more reliably ensures that the front-rear frame 31 is bent and deformed into a Z shape in vehicle side view in the event of a front-end collision.

As shown in FIGS. 1 and 4, the subframe 30 includes a front vehicle body mounting portion Xf, an intermediate vehicle body mounting portion Xm, and a rear vehicle body mounting portion Xr in each of the front-rear frames 31 on both sides. The subframe 30 is mounted to and supported by the front side frames 9 by these three vehicle body mounting portions on each of the left and right sides.

The front vehicle body mounting portion Xf and the rear vehicle body mounting portion Xr are fastened and fixed from a front end of the extended member 39 and a rear end of the body member 36, respectively, to corresponding portions of a bottom side of each front side frame 9 by fastening members.

As shown in FIGS. 1, 2, and 4, the intermediate vehicle body mounting portion Xm includes a mount bracket 80 vertically disposed at an intermediate portion in the vehicle front-rear direction of the body member 36, and is fastened and fixed to a corresponding portion of the bottom side of each front side frame 9 via the mount bracket 80 by a fastening member.

Besides as the mounting portion to mount the subframe 30 to the vehicle body, each mount bracket 80 also serves as a member to mount and support the engine 10. That is, as shown in FIGS. 1 to 3 and 6, the subframe 30 mounts and supports the engine 10, which is a vehicle driving apparatus, via an engine mount portion 81 of the mount bracket 80.

As shown in FIGS. 1 to 3 and 7, the front cross member 32 extends substantially linearly between front ends of the pair of left and right extended members 39, namely between the left and right front horizontal portions 39c so as to connect the front ends in the vehicle width direction. The front cross member 32 is disposed at a position spaced frontward from the front end 10f of the engine 10.

As shown in FIGS. 3 and 7, the center cross member 33 extends substantially linearly between the pair of left and right body members 36 at their portions from the front end to a near-rear portion so as to connect these portions in the vehicle width direction.

By the way, as shown in FIGS. 1 to 4 and 6 to 8, the front vehicle body structure (the structure around the subframe 30 of the present embodiment) includes an electric power steering apparatus 60. The electric power steering apparatus 60 is a so-called dual-pinion electric power steering apparatus and, as shown in FIGS. 1, 2, 6, 8, and 10, includes a substantially cylindrical rack housing 61 extending in the vehicle width direction. As shown in FIGS. 5 and 7, a rack shaft 61x is accommodated in the rack housing 61 such that the rack shaft 61x can slide in the vehicle width direction.

As shown in FIGS. 1 to 3 and 6, both ends of the rack shaft 61x protruding from openings on both ends of the rack housing 61 are connected with respective tie rods 63 each via a joint portion. In other words, each tie rod 63 protrudes outward of the vehicle from a dust boot 64 covering the joint portion. Movement of the rack shaft 61x causes the tie rods 63 to move, which in turn causes the front wheels of the vehicle to turn via a turning mechanism.

Figure 6:
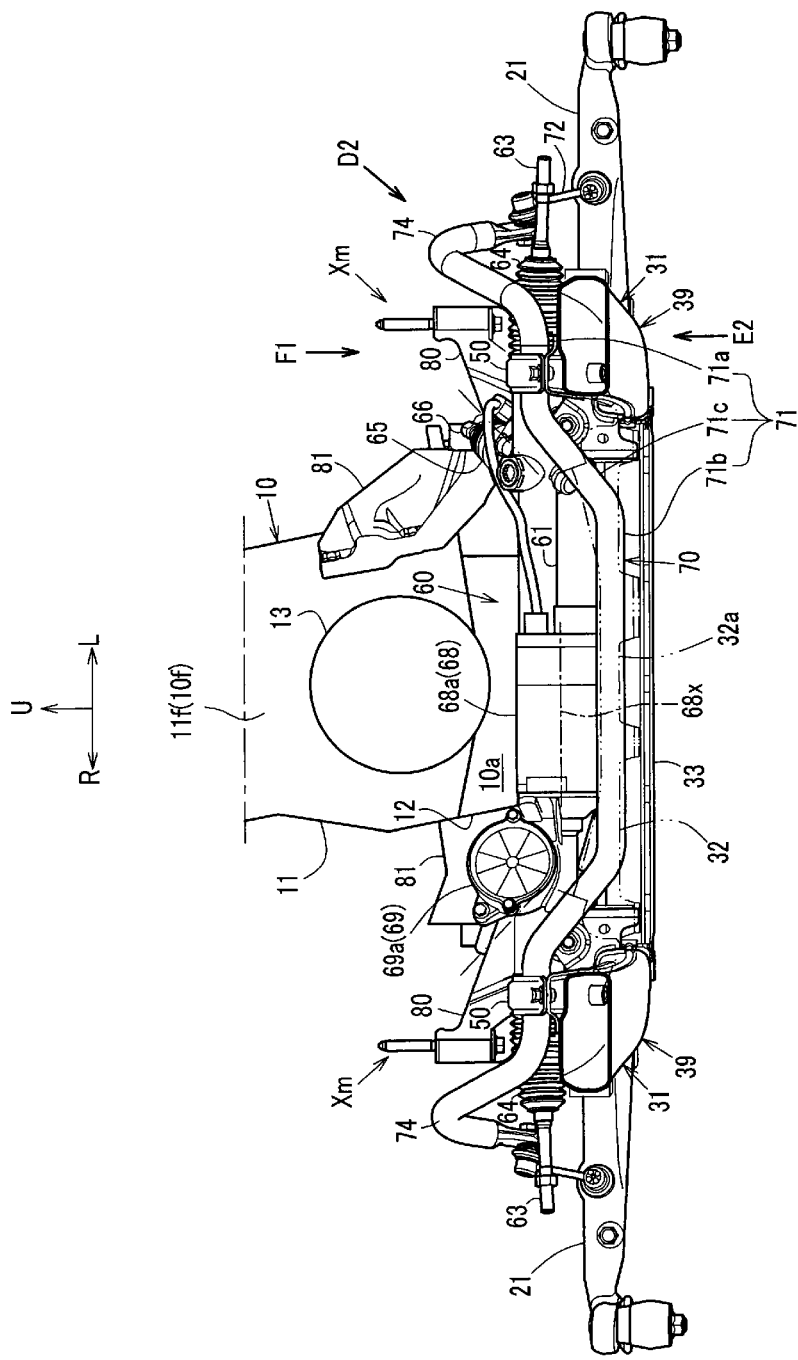
FIG. 6 is a sectional view of major parts taken along the line B-B in FIG. 2.

As shown in FIGS. 1, 2, and 6, the rack housing 61 is provided on its one side in the vehicle width direction (left side of the vehicle) with an input shaft 66 receiving a steering force from a steering shaft and with a steering gear box 65. The input shaft 66 is connected via a universal joint to the steering shaft to which a steering wheel is integrally attached. Also, the input shaft 66 is rotatably supported via a bearing and connected to a steering pinion inside the steering gear box 65.

The steering pinion meshes with the rack shaft 61x (see FIG. 5), and the steering force transmitted to the input shaft 66 by rotation of the steering shaft causes the steering pinion to rotate, which in turn causes the rack shaft 61x to axially slide to the left and right because of the meshing between the steering pinion and the rack shaft 61x.

As shown in FIGS. 2 and 7, the rack housing 61 is formed on its other side in the vehicle width direction (right side of the vehicle) with an auxiliary gear box 67, and a second auxiliary pinion meshing with the rack shaft 61x is accommodated in the auxiliary gear box 67.

As shown in FIGS. 1 to 3, the rack housing 61 is provided on its other side in the vehicle width direction (right side of the vehicle) with an assist motor 68 and a worm gear mechanism 69.

As a reducer for the assist motor 68, the worm gear mechanism 69 reduces rotation transmitted from the assist motor 68 and is interposed between the assist motor 68 and the second auxiliary pinion as shown in FIGS. 1 to 3. The worm gear mechanism 69 is coaxially connected to a spindle of the assist motor 68 and meshes with the second auxiliary pinion.

The electric power steering apparatus 60 assists a driver's steering operation by transmitting a driving force of the assist motor 68, which is controlled according to steering torque of the steering wheel, to the rack shaft 61x via the worm gear mechanism 69 and the second auxiliary pinion while the steering force of the driver's steering is transmitted to the rack shaft 61x via the steering pinion.

As shown in FIGS. 1 and 4, the above electric power steering apparatus 60 is disposed at the front of the engine 10 and between the front side frame 9 and the subframe 30 in the up-down direction.

When the engine 10 is a longitudinal type as in the present embodiment, the transmission 14 is disposed on the rear side of the engine 10 (see FIG. 2), and accordingly layout space limitations on the rear side of the engine 10 restrict vehicle components around the engine 10 including the electric power steering apparatus 60 from being disposed on the rear side of the engine 10. This, in the present embodiment, the above electric power steering apparatus 60 is disposed in the space that is frontward of the front end 10f of the engine 10 in the vehicle front-rear direction and in which the subframe 30 is to be actively deformed in the event of a front-end collision.

Specifically, as shown in FIGS. 3 and 6, the assist motor 68 is transversely disposed substantially at the center between the left and right front-rear frames 31 (substantially at the center in the vehicle width direction) such that an axis 68x of a cylindrical case 68a extends along the vehicle width direction.

The worm gear mechanism 69 (reducer for the assist motor 68) is disposed on one side (right side in the present embodiment) of this assist motor 68 and, as described above, coupled with the spindle protruding from the assist motor 68 to the worm gear mechanism 69 as described above.

That is, as shown in FIGS. 1, 3, and 6, the worm gear mechanism 69 is disposed between the assist motor 68 and the right front-rear frame 31 and substantially at the same height as the assist motor 68. Specifically, as shown in FIG. 6, the worm gear mechanism 69 is disposed with its lower end positioned slightly higher than a lower end of the assist motor 68.

A housing 69a of the worm gear mechanism 69 is formed in a cylindrical shape having a substantially flat front wall. The housing 69a of the worm gear mechanism 69 is disposed with its front wall oriented vertically and facing frontward of the vehicle.

As shown in FIGS. 6 and 7, a retracted portion 10a formed by retracting a front face of the oil pan 12 rearward relative to the front side 11f of the cylinder block 11 is provided below the front side of the engine 10.

Below the front side of the engine 10, the retracted portion 10a is defined as a recessed space that extends rearward from the front side 11f of the cylinder block 11 and upward from a bottom side of the oil pan 12 and opens frontward and downward, and is formed entirely below the front side of the engine 10 in the vehicle width direction.

At least the assist motor 68 and the rack housing 61 of the electric power steering apparatus 60 is disposed in the retracted portion 10a below the front side of the engine 10.

As shown in FIGS. 1 to 3, 5 to 8, and 10, a stabilizer 70 extending in the vehicle width direction is provided frontward of the electric power steering apparatus 60. The stabilizer 70 is disposed frontward of the engine 10 for the same reason as the vehicle components around the engine 10 being disposed frontward of the engine 10 as described above; when the engine 10 is a longitudinal type, there are layout space limitations on the rear side of the engine 10.

The stabilizer 70 is integrally formed of a torsion portion 71 extending in the vehicle width direction and a pair of left and right arm portions 74 each connected to a knuckle via a stabilizer link 72.

Each arm portion 74 is extended rearward in the vehicle from an outer end in the vehicle width direction of the torsion portion 71 so as to straddle from above the dust boot 64 that covers a rack end of the steering gear box 65.

More specifically, each arm portion 74 is extended from an outer end in the vehicle width direction of the torsion portion 71 rearward and upward and then rearward and downward in vehicle side view.

The torsion portion 71 extends linearly in the vehicle width direction along the front cross member 32 near a rear side of the front cross member 32 in vehicle plan view, and is formed longer than a distance between the left and right front-rear frames 31 such that left and right ends of the torsion portion 71 substantially horizontally cross the respective left and right front-rear frames 31 from above.

The torsion portion 71 is integrally formed of a pair of left and right outer horizontal portions 71a located on the vehicle-width-direction outer side and extending horizontally in the vehicle width direction, an inner horizontal portion 71b located lower than the pair of left and right outer horizontal portions 71a and between them in the vehicle width direction and extending horizontally in the vehicle width direction, and inclined portions 71c each connecting, in the vehicle width direction, an inner end in the vehicle width direction of the corresponding outer horizontal portion 71a and an outer end in the vehicle width direction of the inner horizontal portion 71b.

Each outer horizontal portion 71a corresponds to a linear portion that crosses, from above and in the vehicle width direction, the corresponding front-rear frame 31 extending in the vehicle front-rear direction. Each inclined portion 71c extends linearly such that it is inclined downward from the inner end in the vehicle width direction of the corresponding outer horizontal portion 71a toward the vehicle-width-direction inner side. The inner horizontal portion 71b is substantially at the same height as the front cross member 32, which is disposed lower than the upper wall 34a of the front-rear frame 31, and extends linearly in the vehicle width direction along the front cross member 32.

The stabilizer 70 is provided frontward of the assist motor 68 (see FIGS. 1 and 3) and, as shown in FIGS. 1 and 6, is offset from the assist motor 68 in the up-down direction (downward direction in the present embodiment) so as not to overlap the assist motor 68 in vehicle front view.

Specifically, the inner horizontal portion 71b is disposed such that while it partially overlaps the assist motor 68 in the vehicle width direction, an upper end of the inner horizontal portion 71b is located below a lower end of the assist motor 68 as shown in FIGS. 1, 6, and 7. That is, the inner horizontal portion 71b is offset downward from the assist motor 68.

The stabilizer 70 is mounted on the upper walls 34a of the respective front-rear frames 31 via stabilizer mounting brackets 50 (described later) in the vehicle width direction particularly in consideration of positions of the front wheels and bending formability of the stabilizer 70.

Specifically, as shown in FIG. 10, the stabilizer mounting bracket 50 is mounted at an inside position in the vehicle width direction on the upper wall 34a of the corresponding front-rear frame 31.

Meanwhile, as shown in FIG. 6, at least the left inclined portion 71c of the pair of left and right inclined portions 71c of the stabilizer 70 is inclinedly formed at the steepest inclination angle possible that allows the inclined portion 71c to be bent-formed from the above mounting position on the upper wall 34a of the corresponding front-rear frame 31 downward and toward the vehicle-width-direction inner side.

Thus, at least the left inclined portion 71c of the pair of left and right inclined portions 71c is offset from the worm gear mechanism 69, which is provided on the left side of the assist motor 68, to the vehicle-width-direction outer side in vehicle front view (see FIG. 6).

In other words, the stabilizer 70 is extended below and on the vehicle-width-direction outer side of the assist motor 68 and the worm gear mechanism 69 so as to bypass them so that its torsion portion 71 (in particular, the inner horizontal portion 71b and the inclined portion 71c) does not overlap the assist motor 68 and the worm gear mechanism 69 in vehicle front view.

In the configuration in which the electric power steering apparatus 60 and the stabilizer 70 are disposed frontward of the engine 10, this helps avoid reducing a space frontward of the engine 10 in the vehicle front-rear direction that is necessary for the subframe 30 to be deformed into a Z shape in vehicle side view as a result of these vehicle components (the electric power steering apparatus 60 and the stabilizer 70) around the engine 10 interfering with each other in the vehicle front-rear direction at the front of the engine 10 in the event of a front-end collision.

As shown in FIGS. 1, 2, 4 to 8, and 10, left and right ends of the torsion portion 71 of the stabilizer 70 are respectively mounted on the upper walls 34a of the left and right front-rear frames 31 each via the stabilizer mounting bracket 50.

Each stabilizer mounting bracket 50 is mounted on the upper wall 34a of the corresponding front-rear frame 31, mainly on an upper wall (34a) of the inclined portion 39b in the vehicle front-rear direction.

As shown in FIGS. 4, 5, 7, 8, and 10, each stabilizer mounting bracket 50 includes a stabilizer mounting bracket upper member 51 (hereinafter abbreviated as a "bracket upper member 51") and a stabilizer mounting bracket lower member 52 (hereinafter abbreviated as a "bracket lower member 52"). The bracket upper member 51 and the bracket lower member 52 have a substantially equal longitudinal length and, as shown in FIG. 5 in particular, are formed longer than a length (L39b) of the inclined portion 39b in its extending direction.

The bracket lower member 52 is integrally formed of a horizontal upper wall 52a (see FIGS. 5 and 10), an inner wall 52b extending downward from an inner end in the vehicle width direction of the upper wall 52a (see FIGS. 7 and 10), and an outer wall 52c extending downward from an outer end in the vehicle width direction of the upper wall 52a (see FIGS. 8 and 10), and its cross-section perpendicular to the vehicle front-rear direction is formed in a U shape opening downward.

As shown in FIGS. 7 and 10, the inner wall 52b is integrally formed at its lower portion with an inner end flange portion 52bb extending downward and, as shown in FIGS. 8 and 10, the outer wall 52c is integrally formed at its lower portion with an outer end flange portion 52cc extending to the vehicle-width-direction outer side.

The inner end flange portion 52bb of the inner wall 52b of the bracket lower member 52 is joined to the inner wall (34c) of the front-rear frame 31 and the outer end flange portion 52cc of the outer wall 52c of the bracket lower member 52 is joined to the upper wall 34a of the front-rear frame 31 each by welding (see FIGS. 7, 8, and 10).

Thus, the bracket lower member 52 is formed in a pedestal shape with the upper wall 52a raised relative to the upper wall 34a of the front-rear frame 31 (see FIG. 5).

In other words, as shown in FIG. 5, a bottom side of the upper wall 52a of the bracket lower member 52 is separated above from the upper wall 34a of the front-rear frame 31, and a gap 50s in the up-down direction is formed between the upper wall 52a and the upper wall 34a of the front-rear frame 31. The gap 50s extends along the whole length of the bracket lower member 52 in the vehicle front-rear direction.

The upper wall 52a of the bracket lower member 52 is formed on its front and rear sides with mounting holes 53h for fastening and fixing the bracket upper member 51 from above using a bolt B of a fastening member, and a weld nut N of the fastening member is fixed around each of the front and rear mounting holes 53 from the bottom side of the upper wall 52a.

The bracket upper member 51 is formed substantially in an omega shape in vehicle side view. Specifically, as shown in FIGS. 5, 7, 8, and 10, the bracket upper member 51 is integrally formed of a holding portion 51a holding the cylindrical stabilizer 70 and having an inverted U-shaped cross-section perpendicular to the vehicle width direction, and front and rear flange portions 51b, 51c respectively extended frontward and rearward from front and rear ends of the holding portion 51a.

The bracket upper member 51 is fastened and fixed to the upper wall 34a of the front-rear frame 31 at the front and rear flange portions 51b, 51c via the bracket lower member 52 and using the fastening member composed of the bolt B and the weld nut N.

As shown in FIGS. 5, 7, and 8, the stabilizer 70 in this state has its outer horizontal portion 71a of the torsion portion 71 in the vehicle width direction held between the holding portion 51a of the bracket upper member 51 and the upper wall 52a of the bracket lower member 52 from above and below via a cushioning member 55. In other words, the stabilizer 70 is mainly mounted on and supported by the inclined portion 39b of the front-rear frame 31 via the stabilizer mounting bracket 50.

Here, as shown in FIG. 5, the stabilizer mounting bracket 50 extends in the vehicle front-rear direction along the upper wall 34a of the front-rear frame 31, and its length (L50) in the vehicle front-rear direction is substantially equal to, or longer than, the length of the inclined portion 39b (L39b) in its extending direction, as described above. In the present embodiment, the stabilizer mounting bracket 50 is formed slightly longer than the length of the inclined portion 39b (L39b) in its extending direction (L50>L39b).

Also, as described above, the stabilizer 70 is disposed such that its outer horizontal portion 71a crosses the front-rear frame 31 at the inclined portion 39b, namely overlaps the inclined portion 39b in the vehicle front-rear direction (see FIGS. 4, 5, 7, and 8). Thus, the stabilizer mounting bracket 50 is fastened and fixed to the upper wall 34a of the front-rear frame 31 such that the stabilizer mounting bracket 50 holds the stabilizer 70 by its holding portion 51a right above the inclined portion 39b.

However, the stabilizer mounting bracket 50, which has a longer longitudinal length (length in its extending direction) than that of the inclined portion 39b of the front-rear frame 31, is fastened and fixed at a position that is slightly offset frontward relative to the upper wall (34a) of the inclined portion 39b (see FIG. 5 in particular).

Specifically, the stabilizer mounting bracket 50 is disposed such that its front flange portion 51b (or a fastened part of the front flange portion 51b) is positioned frontward of the front boundary portion 39f and its rear flange portion 51c (or a fastened part of the rear flange portion 51c) is positioned frontward of the rear boundary portion 39r.

This results in the stabilizer mounting bracket 50 being disposed to only overlap the front boundary portion 39f of the front and rear boundary portions 39f, 39r in the vehicle front-rear direction of the front-rear frame 31 (see the same figure).

Figure 11A:
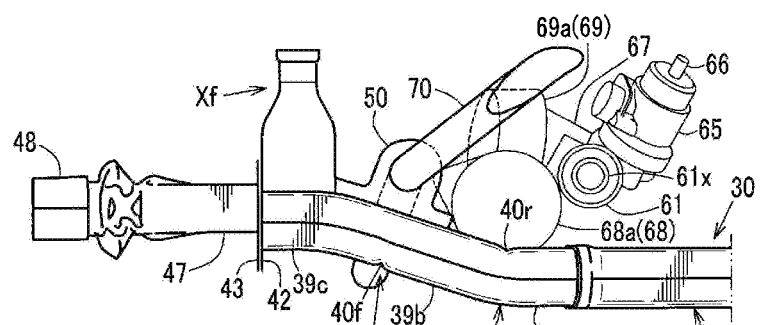
FIGS. 11A to 11D are side views showing a deformed state of the subframe in the event of a front-end collision.
Figure 11B:
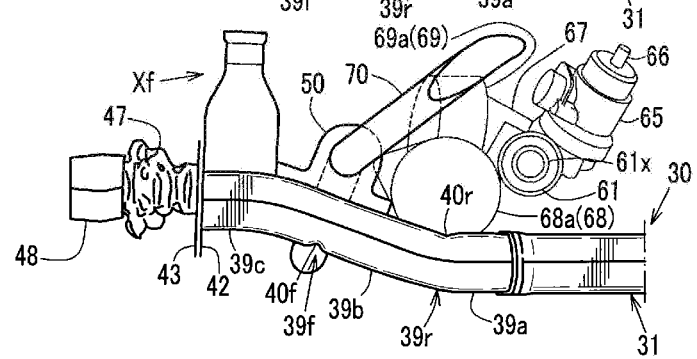
Figure 11C:
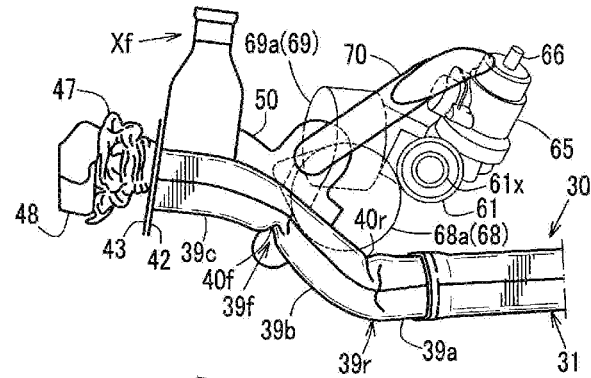

When the front-rear frame 31 is deformed into a Z shape in vehicle side view in the event of a front-end collision, the rear boundary portion 39r is deformed such that its upper wall 34a is bent inward (see FIGS. 11B and 11C). On the other hand, the front boundary portion 39f is deformed such that its upper wall 34a is bent outward (see the same figures).

Comparing disposing the stabilizer mounting bracket 50 so as to cover the upper wall 34a of the front boundary portion 39f, which is bent outward in the event of a front-end collision, and disposing the stabilizer mounting bracket 50 so as to cover the upper wall 34a of the rear boundary portion 39r, which is bent inward in the event of a front-end collision, the former can reduce an influence of the stabilizer mounting bracket 50 that inhibits bending deformation of the corresponding boundary portion in the event of a front-end collision.

Thus, in the present embodiment, the stabilizer mounting bracket 50 is disposed so as to only overlap the front boundary portion 39f of the front and rear boundary portions 39f, 39r in the vehicle front-rear direction of the front-rear frame 31 as described above, in the structure in which the stabilizer 70 is held right above the inclined portion 39b via the stabilizer mounting bracket 50, whose mounting span (LSO) in the vehicle front-rear direction is longer than the longitudinal length (L39b) of the inclined portion 39b (length in its extending direction) of the front-rear frame 31 (see FIG. 5).

However, as shown in FIG. 5, while the upper wall 34a of the front boundary portion 39f is covered with the stabilizer mounting bracket 50 from above, the upper wall 52a of the bracket lower member 52 does not directly contact the upper wall 34a around the front boundary portion 39f but is separated above from it as described above, and thus the gap 50s in the up-down direction is secured between these upper walls 34a, 52a.

This minimizes the influence of the upper wall 52a of the bracket lower member 52 that inhibits outward bending of the upper wall 34a of the front boundary portion 39f at its onset in the event of a front-end collision; such influence would otherwise take place when, for example, the upper wall 52a of the bracket lower member 52 is disposed in close contact from above with the upper wall 34a around the front boundary portion 39f.

Thus, while the upper wall 34a of the front boundary portion 39f is covered from above with the stabilizer mounting bracket 50, the front boundary portion 39f can function as a starting point of breakage in the event of a front-end collision.

Also, as shown in FIGS. 1 to 3, 6, and 7, the front cross member 32 and the stabilizer 70 described above are disposed adjacent to each other in the vehicle front-rear direction. The front cross member 32 includes, at its center in the vehicle width direction, an inner horizontal portion 32a extending substantially horizontally and substantially linearly in the vehicle width direction. The inner horizontal portion 32a of the front cross member 32 and the inner horizontal portion 71b of the stabilizer 70 are disposed substantially at the same height so as to overlap each other in the up-down direction (see FIGS. 6 and 7).

While at least a part of the inner horizontal portion 32a of the front cross member 32 in the vehicle width direction coincides with the assist motor 68 (see FIG. 1), the inner horizontal portion 32a is offset downward from the assist motor 68, similarly to the inner horizontal portion 71b of the stabilizer 70 (see FIGS. 1, 6, and 7).

However, the inner horizontal portion 32a of the front cross member 32 of the present embodiment is not entirely offset downward but a top side 32au of the inner horizontal portion 32a is set lower in height than the lower end 68d of the assist motor 68, as shown in FIG. 7.

Specifically, while the top side 32*au* of the inner horizontal portion 32*a* of the front cross member 32 is positioned lower than the lower end of the assist motor 68, a bottom side 32*ad* of the inner horizontal portion 32*a* of the front cross member 32 is formed without being lowered in position.

Thus, the inner horizontal portion 32*a* of the front cross member 32 is formed such that only the top side 32*au* is lowered in position without the bottom side 32*ad* being lowered, or in other words, is formed to have a lower cross-sectional height (smaller thickness in the up-down direction) so as to lower the top side 32*au* in position; as such, the front cross member 32 itself is set to meet a predetermined minimum ground clearance.

Figure 11D:
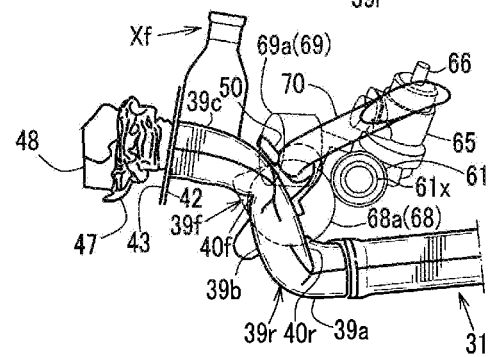
Figure 12:
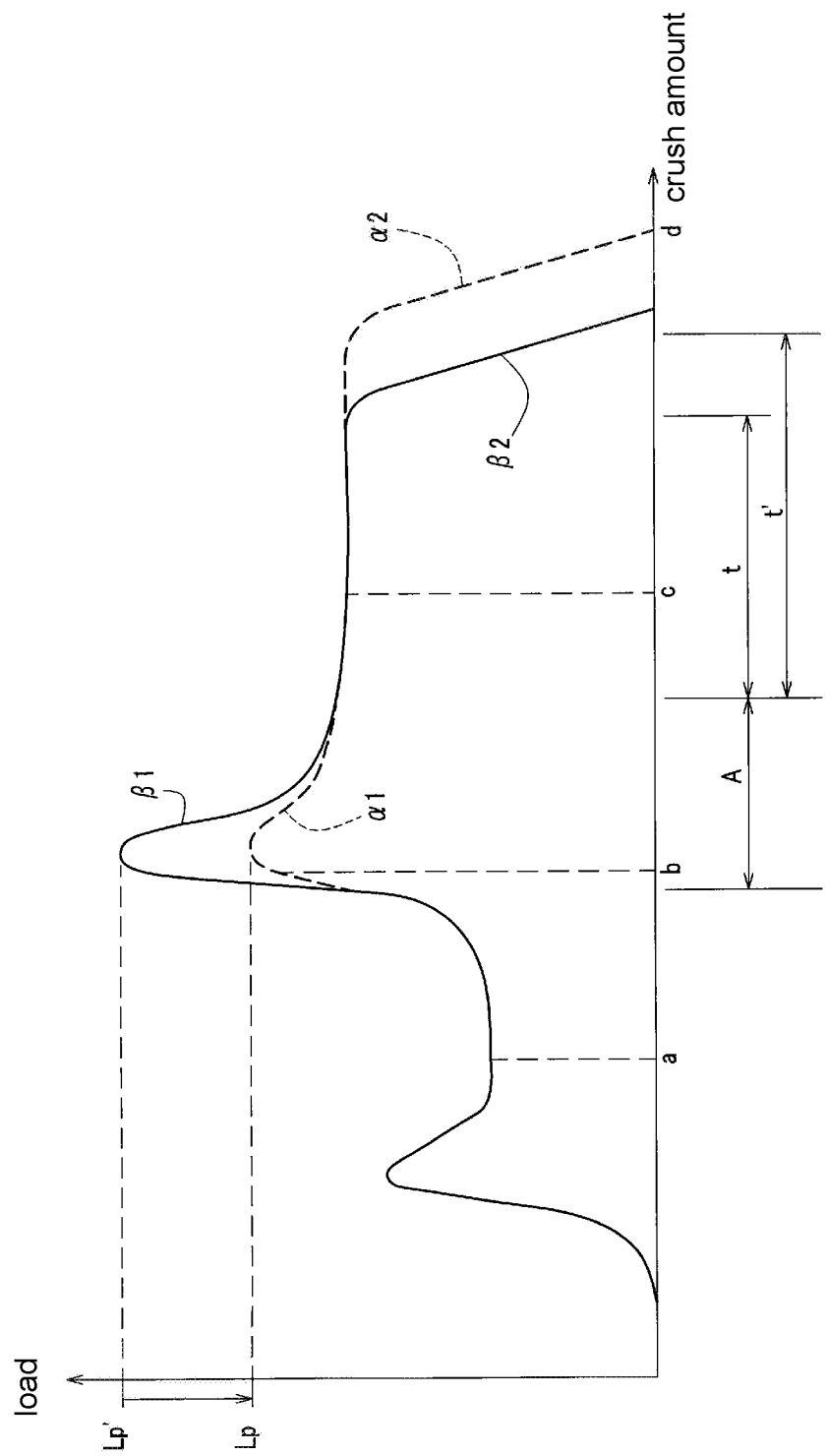
FIG. 12 is a graph showing relationship between a load on the front vehicle body structure in the event of a front-end collision and a crush amount of the subframe structure.

Referring to FIGS. 11A to 11D and 12, a description will be given of how the above-configured subframe 30 of the front suspension functions. FIGS. 11A to 11D are side views showing a deformed state of the sub bumper beam 48, the sub crash cans 47, and the subframe 30 in the event of full-lap collision (front-end collision). FIG. 12 is a graph showing relationship between a load on the vehicle and a crush stroke of the sub crash can 47 and the subframe 30 in the event of a front-end collision.

As shown in FIG. 11A, upon input of a front-end collision load (impact load toward the rear side of the vehicle) on the sub bumper beam 48, a front portion of each sub crash can 47 is crushed by axial compression. Note that FIG. 11A shows a deformed state of each sub crash can 47 when the crush amount is a in FIG. 12.

As the front-end collision progresses, each sub crash can 47 is crushed over its whole length in the front-rear direction, as shown in FIG. 11B. In other words, FIG. 11B shows a deformed state of each sub crash can 47 when the crush amount is b in FIG. 12.

Some load (energy) of the front-end collision load that cannot be absorbed by the axial compression of the sub crash cans 47 is absorbed mainly by the left and right front-rear frames 31 of the subframe 30 as they are deformed into a Z shape in vehicle side view.

Specifically, immediately after the front-rear frames 31 start to be deformed into a Z shape in vehicle side view, stress concentrates on the front boundary portion 39*f* and the rear boundary portion 39*r* of each front-rear frame 31. At that time, as shown in FIG. 12, a load on the vehicle (subframe 30) rises sharply, as a result of which the front-rear frames 31 are elastically deformed such that the front boundary portion 39*f* and the rear boundary portion 39*r* are bent.

As shown in period A in FIG. 12, the load on the vehicle rises sharply immediately after the start of deformation of the front-rear frames 31, and upon the deformation of the front-rear frames 31 transitioning to plastic deformation, the load drops to some extent from its peak Lp during the rising phase (hereinafter referred to as a "peak load Lp").

With a high peak load Lp, a large inertia force acts on an occupant in the event of a front-end collision, which in turn increases impact of an inflating airbag on the occupant. For this reason, it is preferable to minimize the peak load Lp to the extent possible.

In the present embodiment, each front-rear frame 31 is formed with the front recess 40*f* on the lower wall 35*a* of the front boundary portion 39*f* and with the rear recess 40*r* on the upper wall 34*a* of the rear boundary portion 39*r*, and these recesses 40*f*, 40*r* can provide a starting point of breakage of the front-rear frame 31 in the event of a front-end collision, contributing to lowering the peak load Lp.

Additionally, in the present embodiment, the unjoined area 41N where the upper member 34 and the lower member 35 of the front-rear frame 31 are not joined to each other is provided at the portion in the vehicle front-rear direction of the front-rear frame 31 that overlaps (laps) the robust stabilizer mounting bracket 50 and undergoes breakage deformation during the Z-shape deformation of the front-rear frame 31 in vehicle side view (i.e., the portion near the front boundary portion 39*f*), and thereby the portion is made relatively vulnerable in the vehicle front-rear direction. Additionally, the strength of the lower member 39*d* of the extended member 39 is made smaller than that of the upper member 39*u*. These also contribute to lowering the peak load Lp.

With the above countermeasures taken, the present embodiment reduces the peak load Lp as indicated by a waveform α1 of a dashed line in FIG. 12, as compared to a peak load Lp' that takes place when no countermeasures are taken as indicated by a waveform β1 of a solid line in FIG. 12.

As the front-end collision further progresses, as shown in FIG. 11C, the front-rear frame 31 is further deformed into a Z shape in vehicle side view. Note that FIG. 11C shows a deformed state of the subframe 30 when the crush amount is c in FIG. 12.

Specifically, the front-rear frame 31 is bent and deformed with the above front boundary portion 39*f* and rear boundary portion 39*r* as fulcrums such that the front side of the inclined portion 39*b* rises upward and rearward relative to its rear side. In other words, the front horizontal portion 39*c* of the front-rear frame 31 is retracted and displaced upward, and the rear horizontal portion 39*a* (the body member 36) of the front-rear frame 31 has its front side displaced frontward and downward by about 5 to 7 degrees with its rear side as a fulcrum.

Note that the Z-shape deformation of the front-rear frame 31 in vehicle side view refers to deformation in which a front portion of the front-rear frame 31 frontward of the front end 10*f* of the engine 10, such as the front cross member 32, is retracted and thus the front horizontal portion 39*c* and the rear horizontal portion 39*a* are displaced closer to each other in the vehicle front-rear direction while being offset (separated) from each other respectively upward and downward.

Thus, the aforementioned process whereby the front-rear frame 31 is deformed into a Z shape in vehicle side view is merely by way of example; alternatively, only the front horizontal portion 39*c* of the front-rear frame 31 may be retracted and displaced upward while the front side of the rear horizontal portion 39*a* (the body member 36) remains undisplaced downward.

As shown in FIG. 12, after the load has dropped to some extent from the peak load Lp (after the period A), the front-rear frame 31 is plastically deformed to stably receive the applied load lower than the peak load Lp, whereby energy is slowly absorbed. Upon the subframe 30 deforming by an amount equal to the crush stroke (i.e., upon the load becoming zero in FIG. 12), the subframe 30 becomes Z-shaped in vehicle side view as shown in FIG. 11D and can fully absorb the energy of the front-end collision. In other words, FIG. 11D shows a deformed state of the subframe 30 when the crush amount is d in FIG. 12.

In the present embodiment, the stabilizer 70 is extended below and on the vehicle-width-direction outer side of the assist motor 68 and the worm gear mechanism 69 so as to bypass them so that its torsion portion 71 (in particular, the inner horizontal portion 71*b* and the right inclined portion 71*c*) does not overlap the assist motor 68 and the worm gear mechanism 69 in vehicle front view. This prevents these vehicle components disposed at the front of the engine 10 from interfering with each other in the vehicle front-rear direction in the event of a front-end collision. This, in turn, restrains these vehicle components from inhibiting retraction of the front portion of the subframe 30 at the front of the engine 10 (e.g., the front cross member 32) in the event of a front-end collision.

In other words, the present embodiment ensures a longer time period in which the load lower than the peak load Lp is stably applied as shown by a waveform α2 of a dashed line in FIG. 12, as compared to a waveform β2 of a solid line in FIG. 12 (t'>t).

The waveform β2 of the solid line in FIG. 12 represents characteristics of a configuration in which the vehicle components are simply disposed at the front of the engine 10 with no countermeasures taken, and the waveform α2 of the dashed line in FIG. 12 represents characteristics of the configuration in which countermeasures are in place to restrain the vehicle components from inhibiting retraction of the front portion of the subframe 30 at the front of the engine 10 in the event of a front-end collision as in the present embodiment.

Thus, effective use is made of the space at the front of the engine 10 (space between the stabilizer 70 and the assist motor 68) to facilitate deformation of the subframe 30 into a Z shape in vehicle side view and achieve complete crushing thereof, and this allows the subframe 30 to absorb more energy in the event of a front-end collision.

As shown in FIGS. 1 to 4, the vehicle front structure of the present embodiment includes: the engine 10 (vehicle driving apparatus); the rack housing 61 and the rack shaft 61x as a steering rack disposed frontward of the engine 10; the assist motor 68 for power steering disposed frontward of the steering rack 61, 61x; the suspension stabilizer 70 disposed frontward of the assist motor 68; and the subframe 30 mounted with the stabilizer 70. As shown in FIGS. 1 and 6, the stabilizer 70 frontward of the assist motor 68 is disposed offset from the assist motor 68 in the up-down direction so as not to overlap the assist motor 68 in vehicle front view.

The above configuration allows to restrain the retracting stabilizer 70 from interfering with the assist motor 68 located rearward thereof in the event of a front-end collision and thus to ensure energy absorption by the subframe 30.

More specifically, in the present embodiment, the subframe 30 is deformed into a Z shape in vehicle side view in the event of a front-end collision such as by causing a front portion thereof (e.g., the front cross member 32) located frontward of the front end 10f of the engine 10 to retract in the space frontward of the robust engine 10. In this manner, the present embodiment realizes effective energy absorption by the subframe 30 in the event of a front-end collision, in addition to energy absorption by the main crash cans 17, the sub crash cans 47, and the front side frames 9.

Meanwhile, in some vehicles, vehicle components to be disposed around the engine 10, such as the electric power steering apparatus 60 and the stabilizer 70, may be disposed rearward of a rear end of the engine 10, besides those disposed frontward of the front end 10f of the engine 10.

However, when the engine 10 is a longitudinal type as in the present embodiment, the transmission 14 is disposed rearward of the engine 10 (see FIG. 2), and accordingly layout space limitations restrict the above vehicle components around the engine 10 from being disposed rearward of the engine 10. For this reason, in the present embodiment, the above vehicle components around the engine 10 are disposed frontward of the front end 10f of the engine 10.

However, if the above vehicle components around the engine 10, such as the stabilizer 70 and the assist motor 68, are disposed frontward of the front end 10f of the engine 10 so as to overlap each other in the vehicle front-rear direction, the retracting stabilizer 70 may interfere with the assist motor 68 located rearward thereof in the event of a front-end collision. That is, there is fear that the space frontward of the front end 10f of the engine 10 may be reduced in the vehicle front-rear direction due to interference between the stabilizer 70 and the assist motor 68.

Specifically, there is fear that the interference between the stabilizer 70 and the assist motor 68 may inhibit the portion of the subframe 30 frontward of the front end 10f of the engine 10, such as the front cross member 32, from retracting in the space frontward of the front end 10f of the engine 10 in the event of a front-end collision.

That is, since the present embodiment uses the configuration in which use is made of the space above the subframe 30 and frontward of the front end 10f of the engine 10 to deform the subframe 30 into a Z shape in vehicle side view in the event of a front-end collision to thereby make the subframe 30 absorb energy of the front-end collision, layout relationship in the up-down direction between the stabilizer 70, the assist motor 68 and the like disposed in that space is important.

Thus, in the present disclosure, the stabilizer 70 and the assist motor 68 are disposed to be offset (i.e., shifted) from each other in the up-down direction so as not to overlap each other in the vehicle front view, which allows the portion of the subframe 30 located frontward of the front end 10f of the engine 10 to retract further in the space frontward of the front end 10f of the engine 10 in the event of a front-end collision.

Hence, this facilitates deformation of the subframe 30 (i.e., the front-rear frames 31) into a Z shape in vehicle side view in the event of a front-end collision, which allows for increased energy absorption of the front-end collision load by the subframe 30.

In one aspect of this disclosure, as shown in FIGS. 1 and 6, the subframe 30 includes the pair of left and right front-rear frames 31 each mounted with the lower arm 21 (suspension arm), and the stabilizer 70 is disposed at the position offset downward from the assist motor 68. As shown in FIGS. 2 and 6, the worm gear mechanism 69 (reducer for the assist motor) is disposed between the assist motor 68 and one of the front-rear frames 31, and the stabilizer 70 is mounted on the upper walls 34a of the respective front-rear frames 31. As shown in FIGS. 1 and 6, the stabilizer 70 is extended below and on the vehicle-width-direction outer side of the worm gear mechanism 69 and the assist motor 68 so as to bypass them so that the portion of the stabilizer 70 (i.e., the inner horizontal portion 71b and the left and right inclined portions 71c) located on the vehicle-width-direction inner side of its portions mounted on the respective upper walls 34a does not overlap the worm gear mechanism 69 in front view.

The above configuration allows to restrain the retracting stabilizer 70 not only from interfering with the assist motor 68 as described above but also from interfering with the worm gear mechanism 69 in the event of a front-end collision.

Additionally, in the present embodiment, the stabilizer 70 is mounted on the upper walls 34a of the respective front-rear frames 31 each via the stabilizer mounting bracket 50 (see FIGS. 1, 2, 4 to 8, and 10).

That is, in the present embodiment, the stabilizer mounting bracket 50 is mounted not on the lower wall 35a, which is bent inward in the event of a front-end collision as shown in FIGS. 11C and 11D, but on the upper wall 34a, which is bent outward in the event of a front-end collision as shown in FIGS. 11C and 11D, out of the upper wall 34a and the lower wall 35a corresponding to the front boundary portion 39f of each front-rear frame 31.

Specifically, if the stabilizer mounting bracket 50 is mounted on the lower wall 35a corresponding to the front boundary portion 39f of the front-rear frame 31, the presence of the stabilizer mounting bracket 50 on the lower wall 35a, which is bent inward around the front boundary portion 39f in the event of a front-end collision, may inhibit the breakage deformation of the front boundary portion 39f that would otherwise progress more. In contrast, mounting the stabilizer mounting bracket 50 on the upper wall 34a corresponding to the front boundary portion 39f of the front-rear frame 31 as in the present embodiment can reduce the above negative influence that would arise from mounting the stabilizer mounting bracket 50 on the front boundary portion 39f, and can consequently facilitate deformation of each front-rear frame 31 into a Z shape in vehicle side view and increase energy absorption by the subframe 30.

Further, mounting the stabilizer 70 on the upper wall 34a of each front-rear frame 31 via the stabilizer mounting bracket 50 allows to avoid influence of chipping of the stabilizer 70 during travelling of the vehicle.

In terms of reducing weight, the stabilizer 70 is preferably extended linearly in the vehicle width direction. However, if the stabilizer 70 mounted on the upper wall 34a of each front-rear frame 31 is extended linearly, the stabilizer 70 may overlap in vehicle front view the worm gear mechanism 69 and the assist motor 68 located rearward thereof, which brings about fear that the stabilizer 70 may interfere with the worm gear mechanism 69 and the assist motor 68 in the vehicle front-rear direction in the event of a front-end collision.

Hence, in the present embodiment, the stabilizer 70 is disposed offset from the worm gear mechanism 69 and the assist motor 68 in the up-down direction as described above.

However, in the present embodiment, the pulley 13 as an accessory of the engine 10 is provided on the front side (10f) of the engine 10 at the position above the assist motor 68 as described above.

Thus, if the stabilizer 70 is disposed offset upward from the worm gear mechanism 69 and the assist motor 68 as described above, there is fear that retraction of the subframe 30 is inhibited by the retracting stabilizer 70 interfering with the pulley 13 in the space frontward of the front end 10f of the engine 10 in the event of a front-end collision.

In particular, a front side (13f) of the pulley 13 is formed in a flat shape so as to face frontward and thus acts as a receiving surface that receives the retracting stabilizer 70 in the event of a front-end collision. Thus, the interference between the retracting stabilizer 70 and the pulley 13 should be avoided for increasing energy absorbing performance of the subframe 30 in the event of a front-end collision.

Similarly to the pulley 13, a front side of the housing 69a of the worm gear mechanism 69 for the assist motor 68 is formed in a flat shape so as to face frontward and thus acts as a receiving surface that receives the retracting stabilizer 70 in the event of a front-end collision.

Hence, in the present embodiment, the stabilizer 70 is extended below and on the vehicle-width-direction outer side of the worm gear mechanism 69 and the assist motor 68 so as to bypass them so that the portion of the stabilizer 70 located on the vehicle-width-direction inner side of its portions mounted on the upper walls 34a of the respective front-rear frames 31 does not overlap the worm gear mechanism 69 in front view. This allows to restrain the retracting stabilizer 70 from interfering with the assist motor 68 and the worm gear mechanism 69 in the event of a front-end collision.

In the present embodiment, the worm gear mechanism 69, which acts as a receiving surface for the retracting stabilizer 70 as described above, is disposed between the assist motor 68 and one of the front-rear frames 31, namely disposed to be offset (shifted) to the vehicle-width-direction outer side relative to the assist motor 68 disposed at the center in the vehicle width direction, and thus even if the retracting stabilizer 70 should interfere with the worm gear mechanism 69 in the event of a front-end collision, this configuration allows to reduce as much as possible the adverse effects by the worm gear mechanism 69 that inhibit (restrict) retraction of the stabilizer 70, as compared to a configuration in which the worm gear mechanism 69 is disposed at the center in the vehicle width direction.

In one aspect of this disclosure, as shown in FIGS. 1, 6, and 8, the engine 10 includes the cylinder block 11 (the engine body 11) as a vehicle driving apparatus body and the pulley 13 as an accessory projecting frontward from the front side of the cylinder block 11, and the pulley 13 is disposed above the assist motor 68.

When only the positional relationship between the stabilizer 70 and the assist motor 68 is taken into account in disposing the stabilizer 70 offset from the assist motor 68 in the up-down direction, it is possible to dispose the stabilizer 70 offset upward from the assist motor 68; however, since the pulley 13 disposed above the assist motor 68 is provided at the front of the cylinder block 11 as described above, there is fear that the retracting stabilizer 70 would interfere with the pulley 13 in the event of a front-end collision.

Hence, in the present embodiment, the stabilizer 70 is disposed offset downward from the assist motor 68, which allows to avoid interference not only with the assist motor 68 but also with the pulley 13 (accessory) provided to the engine 10 in the event of a front-end collision.

In one aspect of this disclosure, as shown in FIGS. 3 and 6, the assist motor 68 is disposed transversely (in a laid-down posture) such that the axis 68x of the cylindrical case 68a extends along the vehicle width direction.

Even if the retracting stabilizer 70 contacts the assist motor 68 in the event of a front-end collision, the above configuration, in which the assist motor 68 is transversely disposed as described above, allows the stabilizer 70 to retract so as to go below the assist motor 68 while contacting an outer surface of the cylindrical case 68a of the assist motor 68 (see FIGS. 11C and 11D).

This allows the assist motor 68 to direct the stabilizer 70 downward, ensuring that the stabilizer 70 is not caught by the assist motor 68 nor directly received by the front side of the assist motor 68. This facilitates bending deformation of the front-rear frame 31 into a Z shape in vehicle side view in the event of a front-end collision.

In one aspect of this disclosure, as shown in FIGS. 1, 3, 6, and 7, the engine 10 includes the retracted portion 10a formed by retracting the front side of the oil pan 12 rearward relative to the front side 11f of the cylinder block 11, and the assist motor 68 is disposed in the retracted portion 10a.

The above configuration allows to secure distance between the stabilizer 70 and the assist motor 68 in the vehicle front-rear direction as compared to when, for example, the assist motor 68 is disposed frontward of the front side 11f of the cylinder block 11, not in the retracted portion 10a.

This restrains the assist motor 68 from inhibiting retraction of the stabilizer 70 in the event of a front-end collision and consequently facilitates bending deformation of the front-rear frame 31 into a Z shape in vehicle side view.

In one aspect of this disclosure, as shown in FIGS. 1 to 3 and 7 to 10, the subframe 30 includes the front cross member 32 (transverse member) extending in the vehicle width direction, the front cross member 32 and the stabilizer 70 are disposed adjacent to each other in the vehicle front-rear direction, and as shown in FIG. 7, a cross-sectional height of a portion of the front cross member 32 located immediately frontward of the assist motor 68 is set such that its top side 32au is positioned lower than the lower end of the assist motor 68 without its bottom side 32ad being lowered in position.

The above configuration restrains the retracting subframe 30 from interfering with the assist motor 68 in the event of a front-end collision and consequently facilitates bending deformation of the front-rear frame 31 into a Z shape in vehicle side view.

Here, setting the cross-sectional height of the portion of the subframe 30 positioned frontward of the assist motor 68 to be lower than the lower end of the assist motor 68 refers to reducing the thickness in the up-down direction of that portion positioned frontward of the assist motor 68 while maintaining the height of the bottom side 32ad of that portion.

The present disclosure is not limited to the above embodiment and may be embodied in various forms. For example, as long as the front boundary portion 39f is disposed frontward of the front end 10f of the engine 10 in the vehicle, the front-rear frame of the present disclosure may be configured to have its rear boundary portion 39r disposed rearward of the front end 10f of the engine 10 in the vehicle, besides the configuration in which the rear boundary portion 39r is disposed substantially at the same position as the front end 10f of the engine 10 in the vehicle front-rear direction as the front-rear frame 31 in the above embodiment.

While in the above embodiment the description has been given of the structure in which the front-rear frame 31 is bent and deformed into a Z shape in vehicle side view, the present disclosure is not limited to this configuration. For example, the present disclosure encompasses a configuration in which the front-rear frame is axially compressed in the vehicle front-rear direction.

That is, besides the configuration in which the front horizontal portion 39c is offset upward from the rear horizontal portion 39a like the front-rear frame 31 of the present embodiment, the front-rear frame of the present disclosure may also be configured such that the rear horizontal portion 39a, the inclined portion 39b, and the front horizontal portion 39c are disposed so as to extend linearly and substantially horizontally along the vehicle front-rear direction, for example.

While in the present embodiment the stabilizer 70 is employed as a bar-shaped vehicle component disposed so as to extend in the vehicle width direction at the front of the assist motor 68, any other bar-shaped vehicle component than the stabilizer 70 may be applied to the present disclosure as long as it is mounted on the subframe 30 so as to connect between the left and right front-rear frames 31 and can have its portion connecting between the left and right front-rear frames 31 made offset from the assist motor 68 in the up-down direction in front view such as by reducing a vertical width of the portion.

What is claimed is:

1. A vehicle front structure comprising:
   a vehicle driving apparatus;
   a steering rack disposed frontward of the vehicle driving apparatus;
   an assist motor for power steering disposed frontward of the steering rack;
   a bar-shaped vehicle component disposed frontward of the assist motor so as to extend in a vehicle width direction; and
   a subframe mounted with the vehicle component, wherein
   the vehicle component frontward of the assist motor is disposed offset from the assist motor in an up-down direction so as not to overlap the assist motor in vehicle front view.

2. The vehicle front structure according to claim 1, wherein
   the vehicle component is a stabilizer.

3. The vehicle front structure according to claim 1, wherein
   the subframe includes a pair of left and right front-rear frames each mounted with a suspension arm,
   the vehicle component is disposed at a position offset downward from the assist motor,
   a reducer for the assist motor is disposed between the assist motor and one of the front-rear frames, and
   the vehicle component is mounted on left and right upper walls of the respective front-rear frames, and the vehicle component is extended below and on a vehicle width direction outer side of the reducer and the assist motor so as to bypass the reducer and the assist motor so that a portion of the vehicle component located on a vehicle width direction inner side of portions of the vehicle component mounted on the respective left and right upper walls does not overlap the reducer in front view.

4. The vehicle front structure according to claim 3, wherein
   the vehicle driving apparatus includes a vehicle driving apparatus body and an accessory projecting frontward from a front side of the vehicle driving apparatus body, and
   the accessory is disposed above the assist motor.

5. The vehicle front structure according to claim 1, wherein
   the assist motor is disposed transversely such that an axis of a cylindrical case extends along the vehicle width direction.

6. The vehicle front structure according to claim 1, wherein
   the vehicle driving apparatus includes a vehicle driving apparatus body and an oil pan disposed below the vehicle driving apparatus body,
   the vehicle driving apparatus includes a retracted portion below a front side of the vehicle driving apparatus, the retracted portion being formed by retracting a front side of the oil pan rearward relative to a front side of the vehicle driving apparatus body, and
   the assist motor is disposed in the retracted portion.

7. The vehicle front structure according to claim 1, wherein
   the subframe includes a transverse member extending in the vehicle width direction,
   the transverse member and the vehicle component are disposed adjacent to each other in a vehicle front-rear direction, and a cross-sectional height of a portion of the transverse member located immediately frontward of the assist motor is set such that a top side of the portion is positioned lower than a lower end of the assist motor lower without a bottom side of the portion being lowered in position.

8. The vehicle front structure according to claim 3, wherein the assist motor is disposed transversely such that an axis of a cylindrical case extends along the vehicle width direction.

9. The vehicle front structure according to claim 3, wherein the subframe includes a transverse member extending in the vehicle width direction, the transverse member and the vehicle component are disposed adjacent to each other in a vehicle front-rear direction, and a cross-sectional height of a portion of the transverse member located immediately frontward of the assist motor is set such that a top side of the portion is positioned lower than a lower end of the assist motor lower without a bottom side of the portion being lowered in position.

10. The vehicle front structure according to claim 8, wherein the subframe includes a transverse member extending in the vehicle width direction, the transverse member and the vehicle component are disposed adjacent to each other in a vehicle front-rear direction, and a cross-sectional height of a portion of the transverse member located immediately frontward of the assist motor is set such that a top side of the portion is positioned lower than a lower end of the assist motor lower without a bottom side of the portion being lowered in position.

* * * * *